(12) United States Patent
Liu et al.

(10) Patent No.: US 12,009,507 B2
(45) Date of Patent: Jun. 11, 2024

(54) METHODS AND SYSTEMS FOR SALT-RINSE SURFACE DOPING OF ELECTRODE MATERIALS

(71) Applicant: A123 Systems LLC, Novi, MI (US)

(72) Inventors: Lei Liu, Cambridge, MA (US); Kitae Kim, Cambridge, MA (US); Lixin Wang, Belmont, MA (US); Anil Parmar, Marlboro, MA (US); Bryan Kim, Waltham, MA (US); Chloe Harrison, Brighton, MA (US); Andrew Millonig, Billerica, MA (US); Derek Johnson, Fort Collins, CO (US); Eunsung Lee, Winchester, MA (US); Taehwan Yu, Burlington, MA (US)

(73) Assignee: A123 SYSTEMS LLC, Novi, MI (US)

( * ) Notice: Subject to any disclaimer, the term of this patent is extended or adjusted under 35 U.S.C. 154(b) by 15 days.

(21) Appl. No.: 17/443,805

(22) Filed: Jul. 27, 2021

(65) Prior Publication Data

US 2022/0037651 A1    Feb. 3, 2022

Related U.S. Application Data

(60) Provisional application No. 63/059,129, filed on Jul. 30, 2020.

(51) Int. Cl.
| | | |
|---|---|---|
| *H01M 4/36* | (2006.01) | |
| *C01G 53/00* | (2006.01) | |
| *H01M 4/04* | (2006.01) | |
| *H01M 4/505* | (2010.01) | |
| *H01M 4/525* | (2010.01) | |
| *H01M 4/02* | (2006.01) | |

(52) U.S. Cl.
CPC .......... *H01M 4/366* (2013.01); *C01G 53/50* (2013.01); *H01M 4/049* (2013.01); *H01M 4/505* (2013.01); *H01M 4/525* (2013.01); *C01P 2002/52* (2013.01); *C01P 2004/80* (2013.01); *C01P 2006/40* (2013.01); *H01M 2004/028* (2013.01)

(58) Field of Classification Search
None
See application file for complete search history.

(56) References Cited

U.S. PATENT DOCUMENTS

| | | |
|---|---|---|
| 2006/0071198 A1 | 4/2006 | Paulsen et al. |
| 2009/0186277 A1 | 7/2009 | Beck et al. |
| 2011/0244331 A1 | 10/2011 | Karthikeyan et al. |
| 2018/0254483 A1 | 9/2018 | Croy et al. |
| 2019/0148725 A1 | 5/2019 | Choi et al. |

FOREIGN PATENT DOCUMENTS

| | | | | |
|---|---|---|---|---|
| CN | 1794497 A | | 6/2006 | |
| CN | 102738458 A | | 10/2012 | |
| CN | 106684369 A | * | 5/2017 | .......... H01M 10/054 |
| CN | 109950497 A | | 6/2019 | |
| CN | 110444762 A | * | 11/2019 | ........ H01M 10/0525 |
| EP | 2619828 A2 | | 7/2013 | |
| KR | 20160091172 A | | 8/2016 | |
| WO | 2006114047 A1 | | 11/2006 | |
| WO | 2012110600 A2 | | 8/2012 | |
| WO | 2019104099 A2 | | 5/2019 | |

OTHER PUBLICATIONS

Yang et al. SiOx as a Potential Anode Material for Li-Ion Batteries: Role of Carbon Coating, Doping, and Structural Modifications. Rechargeable Batteries—Recent Developments and Future Challenges from Material. (Year: 2018).*
ISA Korean Intellectual Property Office, International Search Report and Written Opinion Issued in Application No. PCT/US2021/071022, dated Dec. 6, 2021, WIPO, 12 pages.

* cited by examiner

*Primary Examiner* — Tanisha Diggs
(74) *Attorney, Agent, or Firm* — McCoy Russell LLP

(57) ABSTRACT

Methods and systems are provided for salt-rinse surface doping of electrode materials for lithium-ion batteries. In one example, a method may include dissolving a dopant salt in a solvent to form a dopant salt rinse solution, rinsing an electrode active material with the dopant salt rinse solution to form a coated electrode active material, and heating the coated electrode active material to form a doped electrode active material. In some examples, a surface region of the doped electrode active material may include a uniform distribution of dopants from the dopant salt rinse solution. In this way, the electrode active material may be rinsed and doped via the dopant salt rinse solution in a single-stage process.

15 Claims, 12 Drawing Sheets

METHODS AND SYSTEMS FOR SALT-RINSE SURFACE DOPING OF ELECTRODE MATERIALS

CROSS REFERENCE TO RELATED APPLICATIONS

The present application claims priority to U.S. Provisional Application No. 63/059,129, entitled "METHODS AND SYSTEMS FOR SALT-RINSE SURFACE DOPING OF ELECTRODE MATERIALS," and filed on Jul. 30, 2020. The entire contents of the above-identified application are hereby incorporated by reference for all purposes.

FIELD

The present description relates generally to methods and systems for doping electrode materials, particularly for surface doping electrode materials with a dopant salt rinse solution.

BACKGROUND AND SUMMARY

Due to relatively high energy density and long cycle life, lithium-ion batteries are a desirable option for powering consumer electronics and electric and hybrid-electric vehicles. Specifically considering vehicle applications, lithium nickel manganese cobalt oxides (NMCs or $Li_aNi_{1-y-z}Mn_yCo_zO_2$) are widely adopted as cathode active materials, as NMCs are known for conferring particularly high energy densities to lithium-ion batteries.

Challenges in developing NMC-based batteries (especially those incorporating high-Ni NMCs) include: (i) increased residual lithium salts on surfaces of primary and secondary NMC particles; and (ii) decreased cycle life. Because $Ni^{2+}$ and $Li^+$ have similar ionic radii, $Ni^{2+}$ ions in high-Ni NMCs tend to occupy $Li^+$ sites during synthesis. As a result, relatively low capacity and cycle life are typically observed when incorporating high-Ni NMCs into Li-ion battery cathodes. In order to overcome such Li/Ni disorder, increased lithium salts may be utilized during a synthesis process of an NMC cathode material to both compensate lithium salt loss and suppress occupation of $Ni^{2+}$ in $Li^+$ sites by shifting chemical equilibrium in favor of $Li^+$. However, increasing the lithium salts used during synthesis may concomitantly increase residual lithium salts left on a surface of the NMC cathode material. The residual lithium salts may then be carried through to a cathode of a pouch cell, which may lead to undesirable gas formation in the pouch cell.

To avoid excess lithium salt following synthesis, the NMC cathode material may be rinsed with water to dissolve and remove lithium salts present at a surface of the NMC cathode material. However, increased contact of the NMC cathode material with water may degrade crystal structures at the surface, leading to significant decreases in cycle life. Besides degraded crystal structures and cracks at the surface of the NMC cathode material, the poor cycle life of NMCs may also result from irreversible phase transitions. To mitigate both issues, metal ions may be doped into the surface and/or core of the NMC cathode material to stabilize the crystal structure thereof by reducing crystal volume changes and suppressing undesirable cationic mixing and phase transitions during cycling. Since the surface of the NMC cathode material is exposed to increased electrolyte and therefore experiences increased lithium intercalation/deintercalation relative to the core, surface doping may be employed to improve cycle life while minimizing capacity sacrifices ascribed to the metal ions being doped.

Surface doping methodologies may be characterized by whether or not solvents are employed to achieve the doping. Each of these doping methodologies are typically adopted following the rinsing to remove the residual lithium salts. So-called "dry" surface doping involves a solvent-free mixing of the NMC cathode material with a dopant agent (such as a metal oxide or a metal hydroxide), followed by heat treatment to induce migration of metal ions into the crystal structure of the NMC cathode material. Since the NMC cathode material is relatively dense, the metal ions may reside near the surface of the NMC cathode material. However, relying on heat-treatment diffusion of the metal ions into the surface of the NMC cathode material may not guarantee uniform distribution of the metal ions on an entirety of the surface. Though higher heat-treatment temperatures may be employed to induce diffusion, undesirable size increases of doped NMC cathode material particles may occur as a result.

Alternatives to dry surface doping include "wet" surface doping approaches, which typically utilize a first step of mixing the NMC cathode material with a solution into which a dopant salt may be dissolved. A resultant mixture may then be dried in a rotary evaporator and pulverized. Accordingly, a more uniform surface doping may be achieved relative to a dry surface doping approach.

The inventors herein have recognized that electrochemical performance issues may still arise when employing such wet surface doping approaches. As one example, drying the resultant mixture may be lengthy and energy-consuming, which may increase an overall soaking time of the NMC cathode material and potentially degrade the crystal structure at the surface (leading to the poor cycle life sought to be avoided by doping approaches). The crystal structure degradation may be at least partially mitigated by using a wet surface coating approach to apply a significant amount of material on the surface of the NMC cathode material. However, decreased capacity and increased production costs typically follow from such wet surface coating approaches.

Additional steps, such as actively adjusting a pH of the mixture to guarantee precipitation of dissolved metal ions on the surface of the NMC cathode material and/or including an acid additive for cleaning of the surface of the NMC cathode material, may be unnecessarily complex and inefficient from an overall cost perspective. Moreover, such additional steps may introduce further issues. For example, acid additives may excessively dissolve $Li^+$ ions at the surface of the NMC cathode material, further compromising capacity and cycling in a finally-formed lithium-ion battery cell.

Such wet surface doping approaches alone may not effectively reduce excess residual lithium salt deposits at the surface of the finally-formed NMC cathode material to a desirable level. For example, precipitated metal ions from the (dopant-containing) solution may react with the residual lithium salt deposits during subsequent heat treatment, at least partially converting excess $Li^+$ deposits into a lithium metal oxide ($LiMO_2$ or other such formula, where M is a metal). However, the reaction may rely on adequate physical contact between the metal ion precipitates and the residual lithium salt deposits, which may not be guaranteed. Even assuming adequate physical contact, an amount of the dopant may not be sufficient to consume all $Li^+$ in the solution since the amount of the dopant may be limited to minimize sacrificial capacity of the finally-formed NMC cathode material. Excess dissolved Li' may therefore precipitate and settle on the surface of the NMC cathode material during drying of the solution (at least some of which may remain following the heat treatment). As a result, a separate rinsing step may be employed to lower the residual lithium salt deposits to the desirable level before wet surface doping may proceed.

The inventors have identified the above problems and have determined solutions to at least partially solve them. In one example, an NMC cathode material may be rinsed with a solution including a rinsing solvent and a dopant salt in a single-stage process which may be both energy- and cost-efficient. Residual lithium salts present at a surface of the NMC cathode material may act as a precipitant in a precipitation reaction to dope in ions from the dopant salt at the surface of the NMC cathode material. Accordingly, the residual lithium salts may be dissolved as a result of the precipitation reaction. In some examples, the residual lithium salts may be reduced to a comparable or decreased level compared to a two-stage rinsing and doping process. In this way, residual lithium salts at the surface of the NMC cathode material may be mitigated without sacrifices to cycle life and minimal capacity degradation.

Indeed, in some examples, the single-stage process described above may enhance cycle life of the NMC cathode material by uniformly doping surfaces of primary particles of the NMC cathode material while minimizing contact with water (e.g., by reducing a total number of "wet" steps and/or by utilizing a rinsing solvent other than water). Further, the single-stage process reduces an overall cost and processing time for forming doped NMC cathode materials. Specifically, decreasing a total number of steps may utilize fewer chemicals and may eliminate a processing time for a doping stage (as the single-stage process may be carried out on a timescale comparable to a rinsing stage alone).

In one example, a method may include dissolving a dopant salt in a rinsing solvent to form a dopant salt rinse solution, rinsing an electrode active material with the dopant salt rinse solution to obtain a uniformly surface-coated electrode active material, and heating the uniformly surface-coated electrode active material to form a uniformly surface-doped electrode active material. In this way, the electrode active material may be rinsed and doped via the dopant salt rinse solution, thereby removing residual lithium salts on a surface region of the electrode active material and improving an overall crystal structure of the electrode active material by doping dopants into the surface region from the dopant salt rinse solution. As such, the method may improve over other methods which add a dopant salt to an NMC-containing solution, as such other methods may result in undesirable agglomeration and non-uniform coating.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
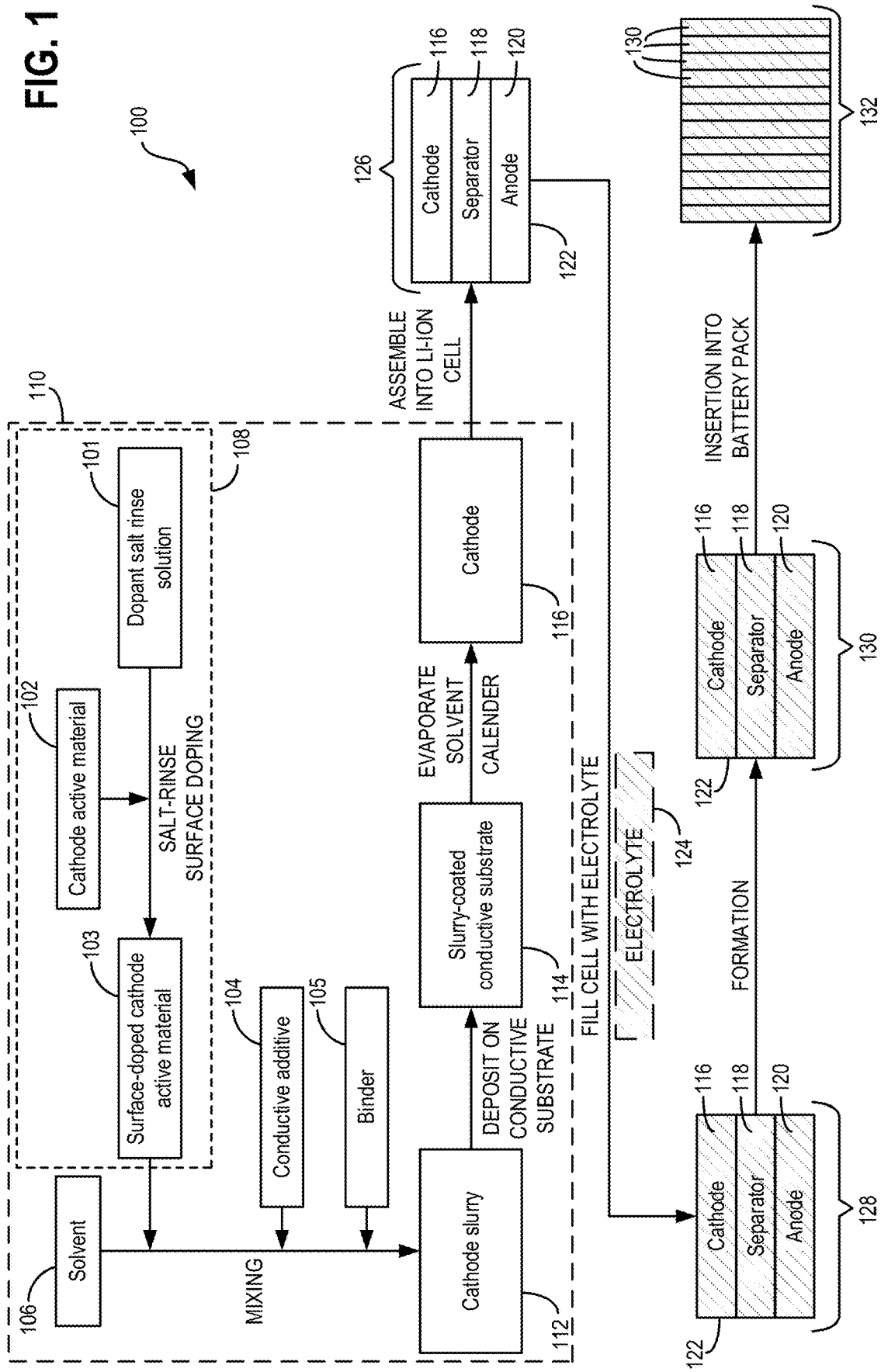
FIG. 1 shows a schematic diagram of an example process for manufacturing a lithium-ion battery pack including a cathode formed via an electrode slurry manufacturing process.

The following description relates to systems and methods for surface doping an electrode material, such as a lithium insertion electrode material for a lithium-ion secondary battery, with a dopant salt rinse solution. In some examples, the electrode material may be a lithiated cathode material, such as a stoichiometric or a lithium-rich lithium nickel manganese cobalt oxide (NMC), a lithium nickel cobalt aluminum oxide (NCA), a lithium nickel cobalt manganese aluminum oxide (NCMA), lithium nickel oxide (LNO), spinel lithium manganese oxide (LMO), spinel lithium nickel manganese oxide (LNMO), a lithium iron phosphate (LFP), or a combination thereof. In one example, the lithiated cathode material may be a high-Ni NMC, where a molar content of nickel may be 60% or greater of a total molar content of nickel, manganese, and cobalt. In other examples, the electrode material may be a lithiated anode material, such as lithium titanate oxide (LTO), graphite, graphene, silicon, a silicon oxide, a tin oxide, or a combination thereof. The dopant salt rinse solution may include one or more dopant ions of any one of Al, Mg, Mn, Co, Ni, Ti, Zr, Sn, Cu, Ca, La, Ce, Y, Nd, W, Na, K, V, Nb, Mo, Fe, Zn, F, Cl, Br, S, Se, P, Sb, Si, Ge, Ga, and B, or a combination thereof. In one example, the dopant ions may include Al ions, Mg ions, Co ions, and/or Mn ions having an ionic radius of 50 to 75 pm. In an additional or alternative example, the dopant ions may include Nd ions, Ce ions, Y ions, and/or La ions having an ionic radius of about 100 pm. As used herein, "about" when referring to a numerical value may encompass a deviation of 5% or less.

In some examples, a volume of the electrode material may be partitioned into a core, or core region, and a surface, or surface region. As such, the surface doping may include doping the dopant ions into the surface of the electrode material via rinsing of the electrode material with the dopant salt rinse solution and subsequent incorporation of the dopant ions. In some examples, the surface-doped dopant ions may enhance binding between transition metal and oxygen atoms in the electrode material, thus relieving strain and particle cracking attributed to volume changes of electrochemically active ions (such as Ni) in a crystal structure of the electrode material and suppressing undesirable phase transitions of the electrode material. In this way, the dopant ions may serve as supporting "pillars" in the crystal structure of the electrode material to provide increased stabilization during delithiation and improve overall cycle life in a finally formed lithium-ion battery cell.

It will be appreciated that further doping/coating in addition to surface doping with the dopant salt rinse solution may be employed to further enhance electrochemical performance and/or stability of the electrode material. For example, one or more dopant ions may be introduced via wet or dry doping approaches prior to the surface doping with the dopant salt rinse solution. Additionally or alternatively, one or more coating materials may be introduced following the surface doping with the dopant salt rinse solution.

FIG. 1 depicts an example method for manufacturing a lithium-ion battery pack. The lithium-ion battery pack may by a lithium secondary battery including a plurality of lithium-ion cells. Each of the plurality of lithium-ion cells may include a cathode formed from an electrode slurry manufacturing process. The electrode slurry manufacturing process may include forming an electrode slurry including a uniformly surface-doped electrode active material. One example of such an electrode slurry manufacturing process is provided by the method of FIG. 2. The uniformly surface-doped electrode active material may be formed by rinsing an undoped or bulk-doped electrode active material with a dopant salt rinse solution, whereby residual lithium salts may be removed from a surface region of the electrode active material, allowing dopant ions to be coated onto and then doped into the surface region.

Such a salt-rinse doping process may improve over other processes by altering a sequence of steps and reducing a total number of steps. As an example, and as shown by the schematically illustrated processes of FIGS. 3 and 4, by dissolving a dopant salt in a solvent to form the dopant salt rinse solution prior to mixing with the electrode active material, a more uniform distribution of dopant ions in the surface region of the electrode active material may be achieved. As another example, and as shown by the schematically illustrated surface-doped electrode active materials of FIGS. 5 and 6, a crystal structure may be stabilized by inclusion of the dopant ions into the surface region via the salt-rinse doping process.

Figure 7:
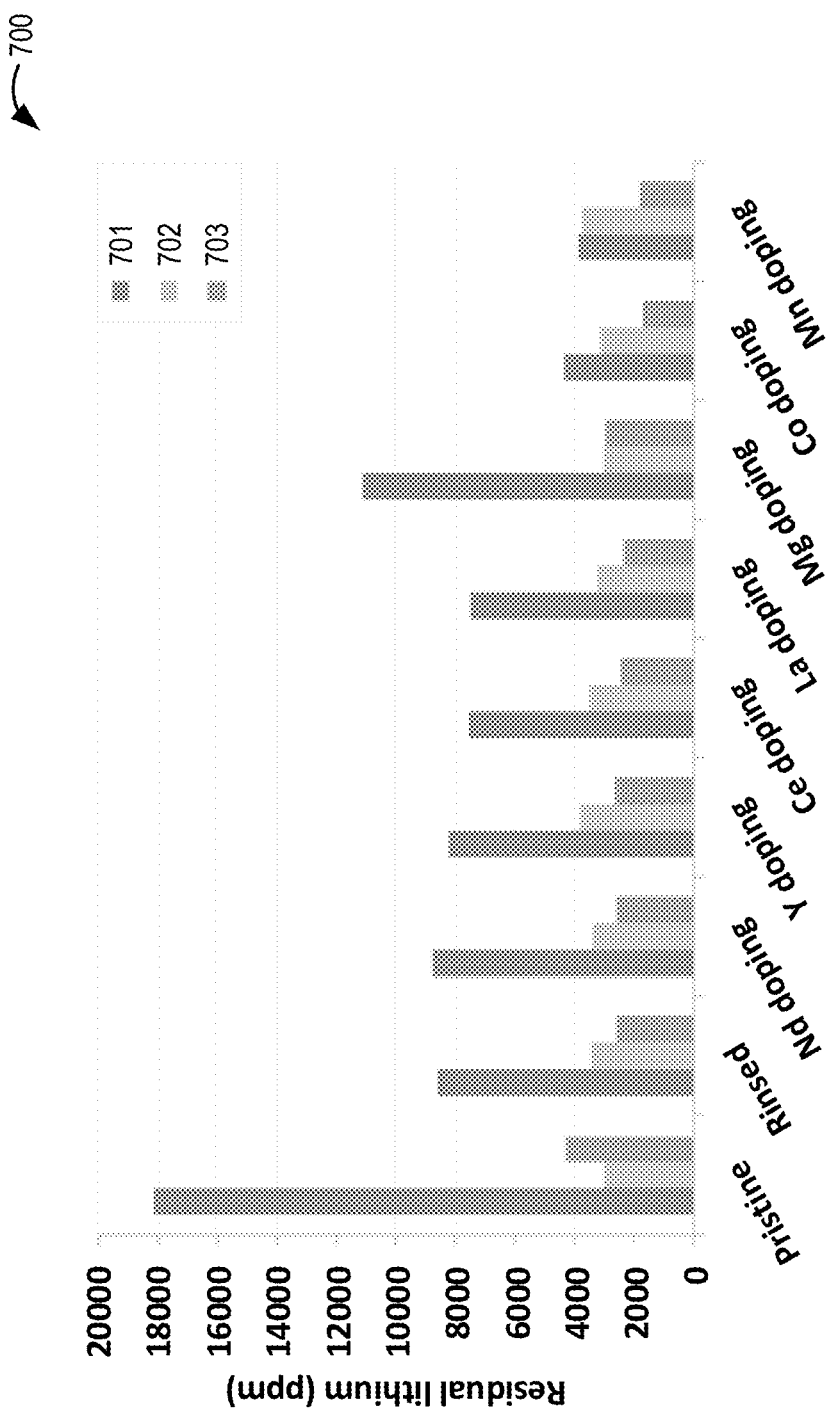
FIG. 7 shows a plot of residual lithium present in pristine and doped Ni-83 lithium nickel cobalt manganese oxide (NMC) cathode materials.
Figure 8:
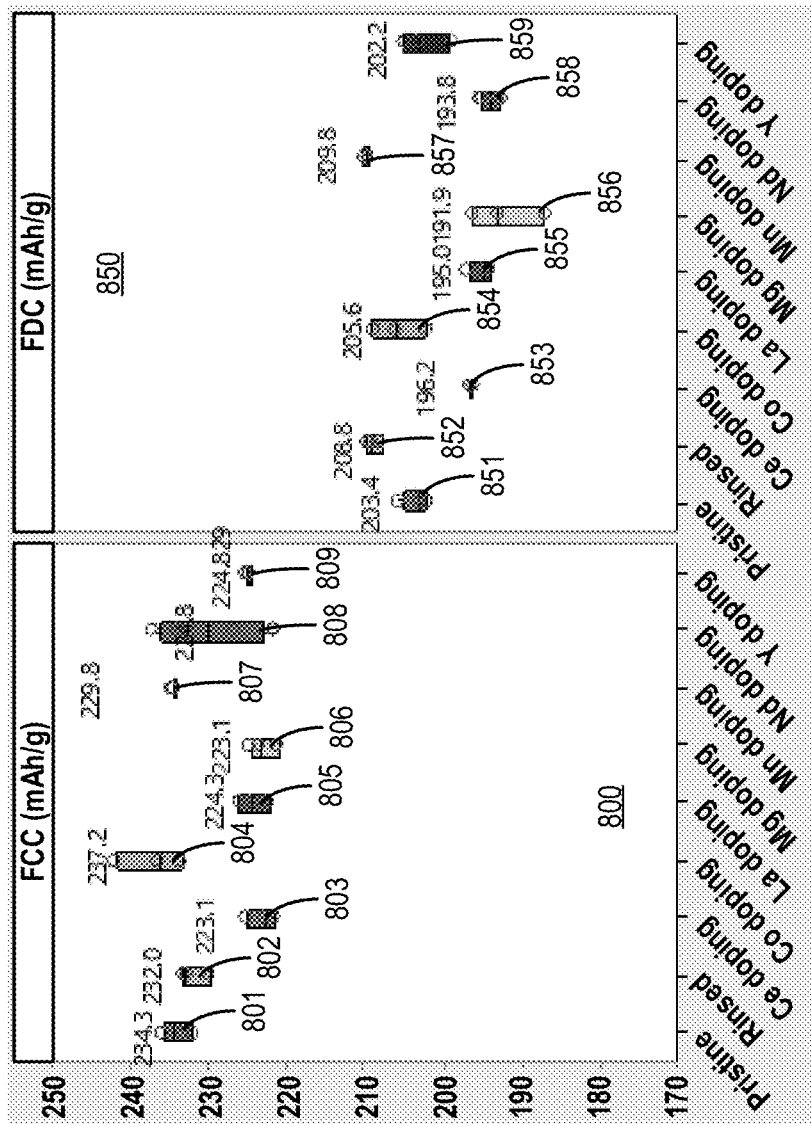
FIG. 8 shows first charge capacities and first discharge capacities in coin cells including pristine and doped Ni-83 NMC cathode materials.
Figure 9:
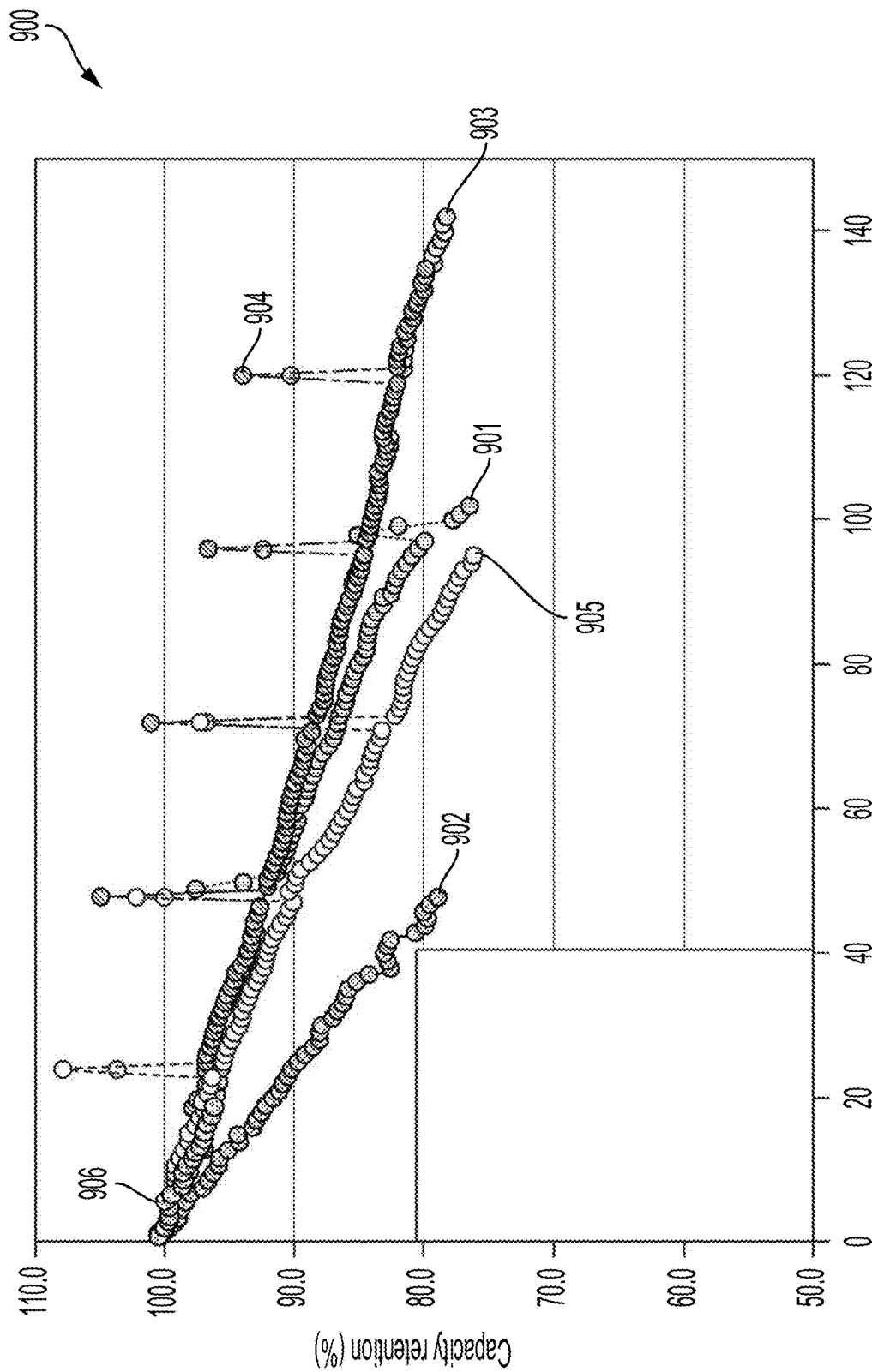
FIG. 9 shows capacity retention over cycling of coin cells including pristine and doped Ni-83 NMC cathode materials.
Figure 10:
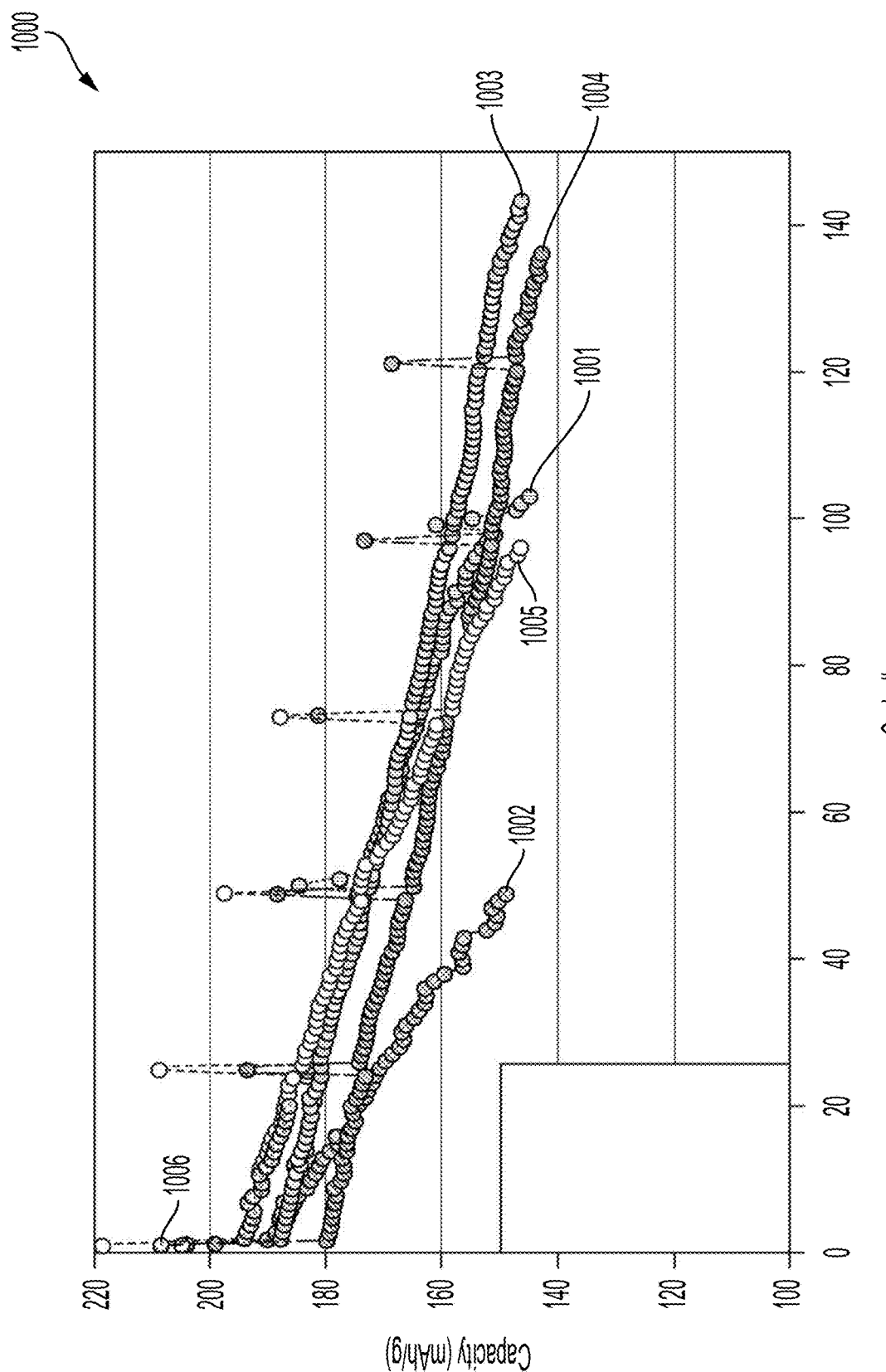
FIG. 10 shows specific capacities over cycling of coin cells including pristine and doped Ni-83 NMC cathode materials.
Figure 11:
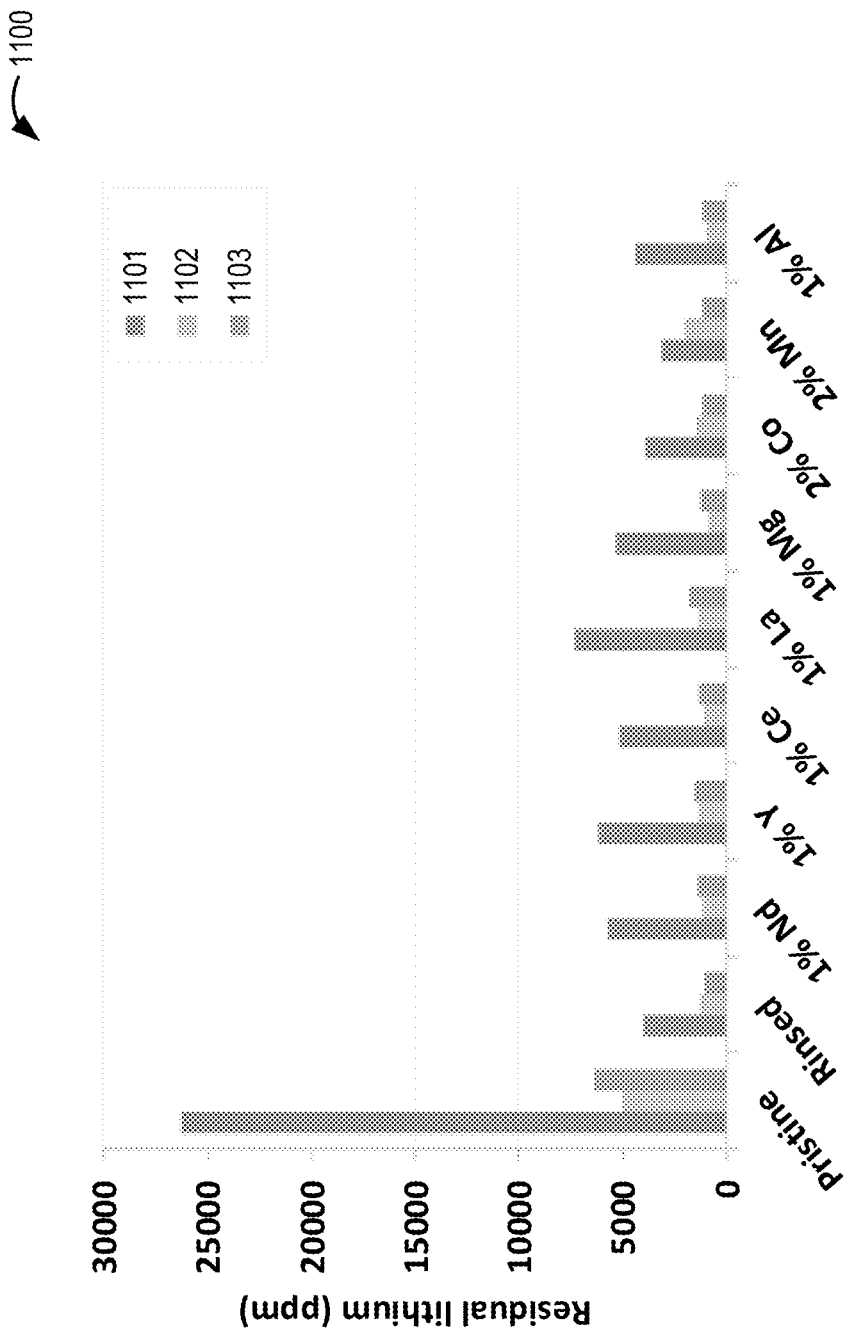
FIG. 11 shows a plot of residual lithium present in pristine and doped Ni-87 NMC cathode materials.
Figure 12:
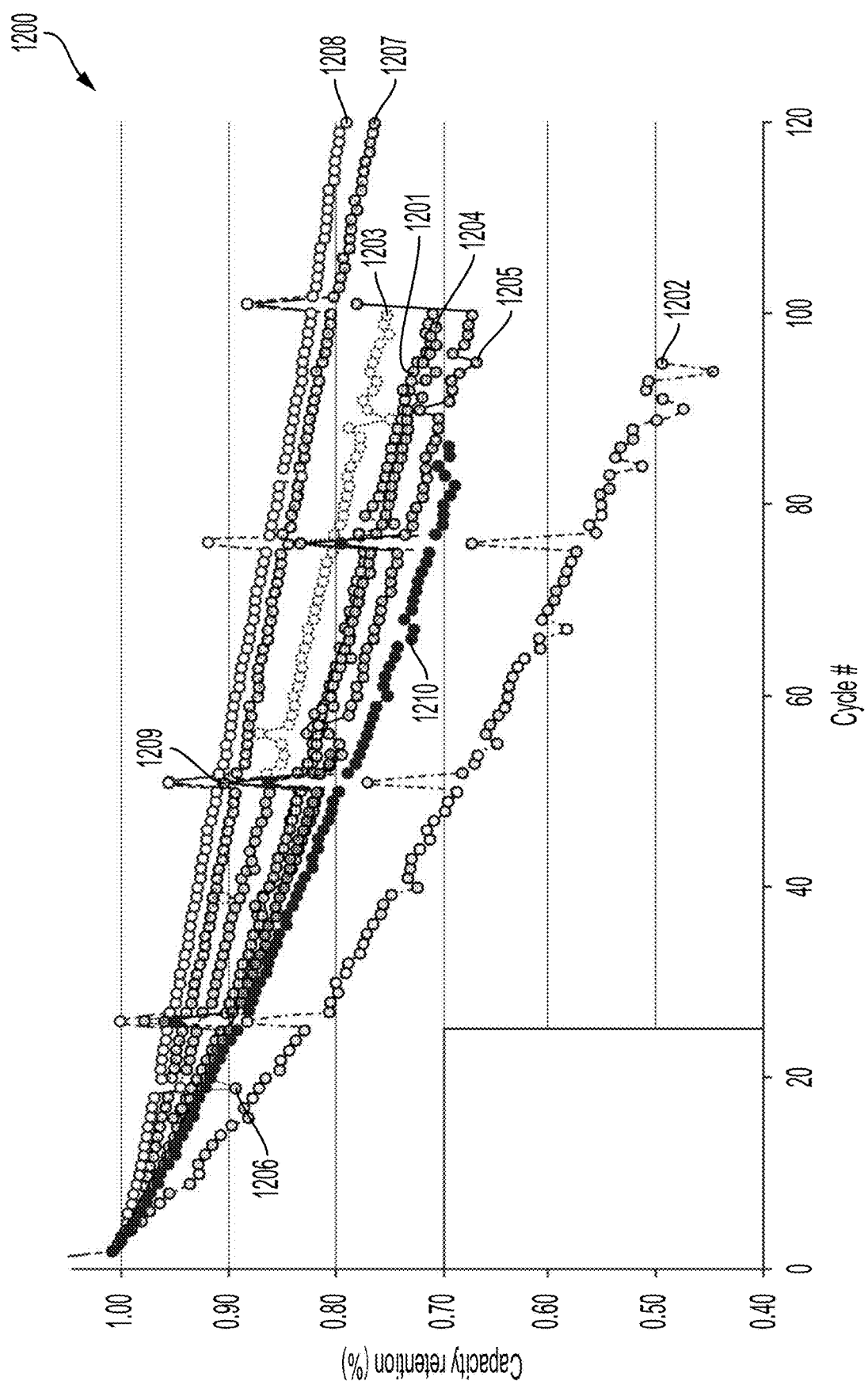
FIG. 12 shows capacity retention over cycling of coin cells including pristine and doped Ni-87 NMC cathode materials.
Figure 13:
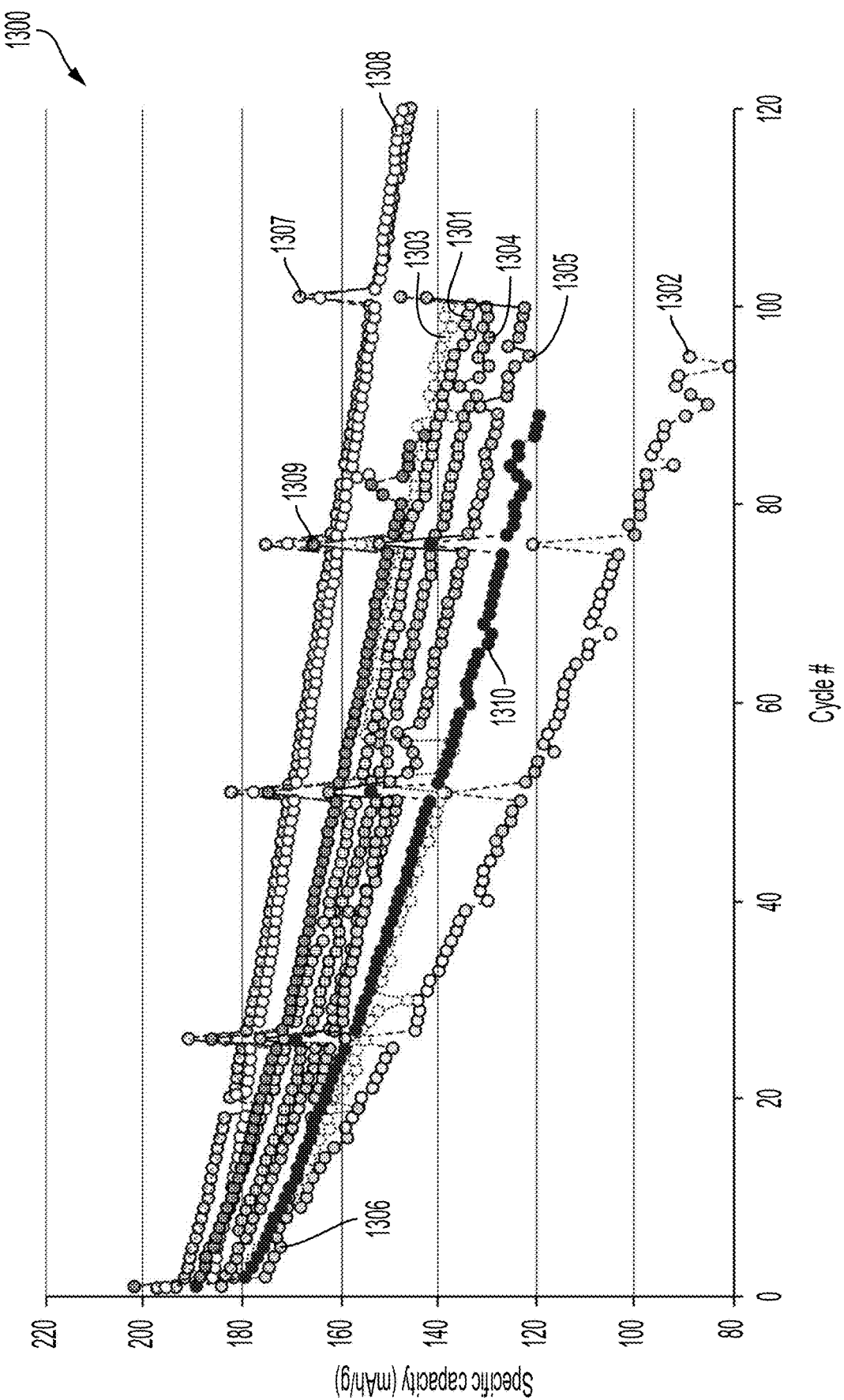
FIG. 13 shows specific capacities over cycling of coin cells including pristine and doped Ni-87 NMC cathode materials.

FIGS. 7 and 11 depict a plot of residual lithium present in pristine and surface-doped NMC cathode active materials. FIG. 8 depicts first charge capacities (FCCs) and first discharge capacities (FDCs) in coin cells including pristine and surface-doped NMC cathode active materials. FIGS. 9 and 12 depict capacity retention over cycling of coin cells including pristine and surface-doped NMC cathode active materials. FIGS. 10 and 13 depict specific capacities over cycling of coin cells including pristine and surface-doped NMC cathode active materials. FIGS. 7-10 depict results from Ni-83 NMC cathode active materials and FIGS. 11-13 depict results from Ni-87 NMC cathode active materials.

Referring now to FIG. 1, a schematic diagram 100 depicts an example process for manufacturing a lithium-ion battery pack 132. The lithium-ion battery pack 132 may include a plurality of lithium-ion cells 130, where each of the plurality of lithium-ion cells 130 may include a cathode 116 formed via a cathode slurry manufacturing process 110.

The cathode slurry manufacturing process 110 may include a salt-rinse surface doping process 108. The salt-rinse surface doping process 108 may be characterized by a single-stage salt-rinse surface doping of a cathode active material 102 with a dopant salt rinse solution 101, where the dopant salt rinse solution 101 may be formed by dissolving dopant particles composed of a dopant salt or precursor in a rinsing solvent.

In some examples, the dopant salt may include one or more compounds, including, for example, one or more dopant oxides, one or more dopant acetates, one or more dopant nitrides, one or more dopant sulfates, one or more dopant fluorides, one or more dopant nitrates, one or more dopant phosphides, one or more dopant sulfides, one or more dopant iodides, one or more dopant phosphates, one or more dopant carbonates, one or more dopant oxalates, one or more dopant acetylacetones, or a combination thereof. In one example, the dopant salt may include one or more metal nitrates.

The dopant salts may include dopant ions, such as metal cations or metal anions. In some examples, the dopant ions may include cations or anions of any one of Al, Mg, Mn, Co, Ni, Ti, Zr, Sn, Cu, Ca, La, Ce, Y, Nd, W, Na, K, V, Nb, Mo, Fe, Zn, F, Cl, Br, S, Se, P, Sb, Si, Ge, Ga, and B, or a combination thereof. In other examples, the dopant ions may include cations of Mn and/or cations of Co. In some examples, the dopant salt may be a metal salt of any one of Al, Mg, Mn, Co, Ni, Ti, Zr, W, F, and B, or a combination thereof. In one example, the dopant salt may not include Mn. In some examples, the dopant ions may have an ionic radius of 50 pm or greater. In some examples, the dopant ions may have the ionic radius of about 50 pm or greater and about 75 pm or less. In other examples, the dopant ions may have the ionic radius of about 100 µm.

The dopant salt may be selected based on a number of factors, including a sintering temperature at which the dopant ions may react with the cathode active material 102, as well as various solubility considerations, etc. As an example, the dopant salt may be selected such that the sintering temperature may be less than a threshold temperature (reciprocally, an optimal selection of the sintering temperature may vary based on at least the selected dopant salt; specifically, the sintering temperature may be selected to balance considerations as to maximizing dopant diffusion into a crystal structure of the cathode active material 102 while minimizing a particle growth of the cathode active material 102). As another example, the dopant salt may be selected to have a relatively high solubility in the rinsing solvent. For instance, the dopant salt may be a metal nitrate and the rinsing solvent may be water. As yet another example, the dopant salt may be selected to form a low-solubility precipitate when the dopant salt participates in a precipitation reaction with residual lithium salts on a surface of the cathode active material 102. A high-solubility product salt may also be formed from the precipitation reaction. In one example, the low-solubility precipitate may have a lower solubility than each of the residual lithium salts and the high-solubility product salt, and the high-solubility product salt may have a higher solubility than each of the residual lithium salts. For example, the low-solubility precipitate may be a metal hydroxide and/or a metal carbonate, the high-solubility product salt may be a lithium nitrate, and the residual lithium salts may include lithium hydroxide and lithium carbonate. Because the dopant salt may be selected to form the low-solubility precipitate, the precipitation reaction may be favored in examples even accounting for the high-solubility product salt. It will be understood that such solubility considerations are not to be taken as limiting. For instance, the solubility of the high-solubility product salt may be lower than the solubility of the residual lithium salts while still being high enough to be substantially dissolved in the rinsing solvent ("substantially" may be used herein as a qualifier meaning "effectively"). Additionally or alternatively, in some examples, relatively little residual lithium salts may remain such that relative solubility of the high-solubility product salt becomes less important.

In some examples, the rinsing solvent may be water, such that the dopant salt rinse solution 101 may be an aqueous solution. In other examples, the rinsing solvent may be an organic solvent including ethanol, methanol, isopropanol, acetone, acetone nitrile, ethyl acetate, ethylene glycol, or a combination thereof.

The cathode active material 102 may be an active material suitable for use in a cathode for a lithium secondary battery, such as the cathode 116. As such, the cathode active material 102 may include one or more lithium insertion cathode materials (such as lithium intercalating compounds, lithium accepting compounds, etc.). The one or more lithium insertion cathode materials may be selected to incorporate one or more dopant ions or a coating without an overall structure or chemical composition being substantially altered. For example, the cathode active material 102 may be a lithiated compound, such as NMC, NCA, NCMA, LNO, spinel LMO, spinel LMNO, LFP, or a combination thereof. In some examples, the cathode active material 102 may include a lithium nickel metal oxide. The lithium nickel metal oxide may have a structural formula of $Li_aNi_{1-x}M_xO_2$ ($0 \le a \le 2$, $0 \le x \le 1$), where M is a metal (for example, a transition metal, an alkaline earth metal, such as Mg, etc.). In one example, the cathode active material 102 may include NMC. NMC may have a structural formula of $Li_aNi_{1-y-z}Mn_yCo_zO_2$ ($0 \le a \le 2$, $0 \le y \le 1$, $0 \le z \le 1$, $0 \le y+z \le 1$). In some examples, the structural formula may be lithium-rich, so that $a > 1$, or stoichiometric, so that $a=1$. In some examples, $0 \le y+z \le 0.4$. In some examples, $0 \le y+z \le 0.3$. For example, y+z may equal 0.13 or 0.17. Further example compositions of NMC may include $LiNi_{1/3}Mn_{1/3}Co_{1/3}O_2$ or $LiNi_{0.333}Mn_{0.333}Co_{0.333}O_2$ (NMC111), $LiNi_{0.5}Mn_{0.2}Co_{0.3}O_2$ (NMC523), $LiNi_{0.6}Mn_{0.2}Co_{0.2}O_2$ (NMC622), and $LiNi_{0.8}Mn_{0.1}Co_{0.1}O_2$ (NMC811). In another example, the cathode active material 102 may include NCA. NCA may have a structural formula of $Li_aNi_{1-y-z}Co_yAl_zO_2$ ($0 \le a \le 2$, $0 \le y \le 1$, $0 \le z \le 1$, $0 \le y+z \le 1$). In another example, the cathode active material 102 may include NCMA. NCMA may have a structural formula of $Li_aNi_{1-x-y-z}Co_xMn_yAl_zO_2$ ($0 \le a \le 2$, $0 \le x \le 1$, $0 \le y \le 1$, $0 \le z \le 1$, $0 \le x+y+z \le 1$). In another example, the cathode active material may include LNO. LNO may have a structural formula of $Li_aNi_xO_2$ ($0 \le a \le 2$, $0 \le x \le 2$). In another example, the cathode active material 102 may include LMO, such as spinel LMO. Spinel LMO may have a structural formula of $Li_aMn_xO_4$ ($0 \le a \le 2$, $1 \le x \le 3$). In another example, the cathode active material 102 may include LNMO, such as spinel LNMO. Spinel LNMO may have a structural formula of $Li_aNi_xMn_yO_4$ ($0 \le a \le 2$, $0 \le x \le 1$, $1 \le y \le 2$). In another example, the cathode active material 102 may include LFP. LFP may have a structural formula of $Li_aFePO_4$ ($0 \le a \le 2$). It will be appreciated that other cathode active materials may be contemplated within the scope of the present disclosure.

In some examples, the cathode active material 102 may be in a form of particulates or particles. In one example, the particles may be microscale particles. As an example, a size of the cathode active material particles may be greater than about 0.5 μm and less than about 20 μm. As another example, the cathode active material 102 particles may have a D50 size range of 2 to 20 μm. As another example, the cathode active material 102 particles may have a D50 size range of 1 to 10 μm. As another example, the cathode active material 102 particles may have a D50 size of about 3 μm. The cathode active material 102 may be in the form of secondary particles including agglomerations of chemically- or mechanically-bound, nanoscale primary particles.

In some examples, the cathode active material 102 may be pristine; that is, the cathode active material 102 may be substantially entirely composed of the one or more lithium insertion cathode materials. However, in other examples, the cathode active material 102 may be bulk doped prior to being included in the salt-rinse surface doping process 108. For example, the cathode active material 102 may be bulk doped during a synthesis process thereof, such as during co-precipitation of a non-lithiated precursor (for instance, an NMC precursor) or during calcination of a mixture of a lithium salt, the non-lithiated precursor, and one or more bulk dopants.

As a result of the synthesis process of the cathode active material 102, a surface thereof may include residual lithium salts. The residual lithium salts may include lithium hydroxide (LiOH) and lithium carbonate ($Li_2CO_3$), for example. The residual lithium salts, left untreated on the surface of the cathode active material 102, may generate undesirable gases in the lithium-ion battery pack 132 as finally formed. Accordingly, the cathode active material 102 may be rinsed with the dopant salt rinse solution 101 to dissolve the residual lithium salts thereon while doping the dopant ions into the surface of the cathode active material 102.

Specifically, the cathode active material 102 may be mixed into the dopant salt rinse solution 101. The mixing may include briefly stirring at a standard stirring speed. For example, the mixing may include stirring at 500 rpm for 5 min. During mixing, the residual lithium salts may function as a precipitant in the following generalized (stoichiometrically imbalanced) precipitation reaction:

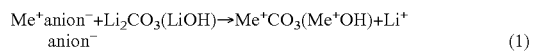

$$Me^+anion^- + Li_2CO_3(LiOH) \rightarrow Me^+CO_3(Me^+OH) + Li^+anion^- \quad (1)$$

where $Me^+$ is a metal cation of the dopant salt having an integer positive charge, $anion^-$ is an anion of the dopant salt having an integer negative charge, and where LiOH and $Me^+OH$ are salts which may be substituted for salts $Li_2CO_3$ and $Me^+CO_3$, respectively (however, it will be appreciated that other soluble bases and soluble base additives may be utilized as the precipitant within the scope of the present disclosure). In some examples, $Me^+CO_3$ may have a lower solubility than each of the residual lithium salts. In additional or alternative examples, the $Li^+anion^-$ salt may have a higher solubility than each of the residual lithium salts. In other examples, the solubility of the $Li^+anion^-$ salt may be lower than the solubility of the residual lithium salts while still being high enough to be substantially dissolved in the rinsing solvent. Accordingly, mixing the cathode active material 102 with the dopant salt rinse solution 101 may dissolve at least a majority, or substantially all, of the residual lithium salts on the surface of the cathode active material 102 via reaction (1).

A resultant mixture may be transferred to a filtration flask coupled to a vacuum pump to isolate a filtrate. The filtrate may be dried in a vacuum oven. For example, the drying may include drying for less than 24 hours at about 120° C.

or less. The dried filtrate may be transferred to a box furnace for calcination or sintering to obtain a surface-doped cathode active material 103. For example, the dried filtrate may be heated at a temperature ramping rate of 5° C./min up to a predetermined calcining/sintering temperature, whereat the dried filtrate may be calcined/sintered for 5 hours followed by a natural cooling phase to room temperature.

The surface-doped cathode active material 103 may include a core region and a surface region, where the surface region extends from a maximum outer extent of the core region to the (outer) surface of the cathode active material 102 particles. The dopant ions from the dopant salt rinse solution 101 may be uniformly doped into the surface region of the surface-doped cathode active material 103. Herein, "uniform" when describing doping of a given electrode active material may be used to describe substantially similar density of the dopant ions in or on any threshold portion of the surface (for example, the threshold portion may include a total surface area or less than the total surface area) of the given electrode active material.

Specifically, the dopant ions may be more uniformly doped into the surface region of the surface-doped cathode active material 103 via the salt-rinse surface doping process 108 than via a dry surface doping process. That is, a distribution of the dopant ions resulting from the salt-rinse surface doping process 108 (which leverages a wet surface doping approach) may not be as sensitive to heat-treatment (calcining, sintering, etc.) temperatures as a corresponding dry surface doping approach. Conversely, employing higher temperatures to promote a more uniform distribution of the dopant ions may result in undesirable particle size growth of a resulting doped cathode active material.

In some examples, the dopant ions may be included in the surface region of the surface-doped cathode active material 103 at 0.1 to 2 mol %. In other examples, the dopant ions may be included in the surface region of the surface-doped cathode active material 103 at 1 to 2 mol %. In examples wherein the cathode active material 102 is NMC, the dopant ions may be cations of Mn and/or cations of Co and may be included in the surface region of the surface-doped cathode active material 103 at 0.1 to 15 mol %. In additional or alternative examples wherein the cathode active material 102 is NMC and the dopant ions are cations of Mn and/or cations of Co, the dopant ions may be included in the surface region of the surface-doped cathode active material 103 at 1 to 3 mol %. Specifically, since Mn and Co are native to NMC, excess Mn and Co may be doped into the surface region of the cathode active material 102 with lower penalties to capacity in the lithium-ion battery pack as finally formed. Further, since Mn and Co are native to NMC, in certain examples wherein the cathode active material 102 is NMC and the dopant ions are cations of Mn and/or cations of Co, the surface-doped cathode active material 103 may also be referred to as NMC. In additional or alternative examples wherein the cathode active material 102 is NMC, the surface-doped cathode active material 103 may be referred to as doped NMC.

In some examples, less than 10000 ppm of residual lithium salts may be present in the surface region of the surface-doped cathode active material 103. In one example, a total amount of residual lithium salts may be determined based on a total weight of Li$^+$ in both lithium carbonate and lithium hydroxide in the surface region (also referred to herein as "free Li") relative to a total weight of the surface-doped cathode active material 103.

Components of a cathode slurry 112, including the surface-doped cathode active material 103, a conductive additive 104, and a binder 105, may be mixed into a solvent 106. The solvent 106 may be an organic solvent, such as N-methyl-2-pyrrolidone (NMP).

The conductive additive 104 may be carbonaceous. The conductive additive 104 may be a single material or a plurality of materials. The conductive additive 104 is not particularly limited in composition and may be any known by one of ordinary skill in the art. For example, the conductive additive 104 may be carbon (for example, carbon black, acetylene black, etc.) and a source thereof may include polyvinyl alcohol (PVA), polyvinyl butyral, sugar, or other source, or combination of sources, where the source may accordingly be carbonized.

The conductive additive 104 may be in the form of particulates or particles. The conductive additive 104 particles may have a range of sizes or may be close in size. The conductive additive 104 particles may have a D50 size range of less than 10 µm, or a D50 size of about 3 µm, for example. In one example, the conductive additive 104 particles may be composed of acetylene black and may have the D50 size range of 30 to 45 nm. In some examples, the conductive additive 104 particles may be substantially round. In additional or alternative examples, the conductive additive 104 particles may be flakes, such that the particles are approximately plate-shaped (e.g., visually identifiable as plates). In additional or alternative examples, the conductive additive 104 particles may be irregularly shaped, such that the particles do not approximate common geometric shapes, and that the particles vary in shape and size relative to one another. In additional or alternative examples, the conductive additive 104 may be in the form of fibers.

The conductive additive 104 may be up to 15% of physical solids in a finally-formed cathode slurry, such as the cathode slurry 112. In some examples, the conductive additive 104 may be 10% or less of the physical solids in the cathode slurry 112. In some examples, the conductive additive 104 may be 5% or less of the physical solids in the cathode slurry 112. In some examples, the conductive additive 104 may be 0.01-15% of the physical solids in the cathode slurry 112. In some examples, the conductive additive 104 may be 1-15% of the physical solids in the cathode slurry 112. In some examples, the conductive additive 104 may be 1-10% of the physical solids in the cathode slurry 112. In some examples, the conductive additive 104 may be 1-8% of the physical solids in the cathode slurry 112. In some examples, the conductive additive 104 may be 3-15% of the physical solids in the cathode slurry 112. In some examples, the conductive additive 104 may be 3-10% of the physical solids in the cathode slurry 112. In some examples, the conductive additive 104 may be 3-8% of the physical solids in the cathode slurry 112. In some examples, the conductive additive 104 may be 5-15% of the physical solids in the cathode slurry 112. In some examples, the conductive additive 104 may be 5-10% of the physical solids in the cathode slurry 112. In some examples, the conductive additive 104 may be 5-8% of the physical solids in the cathode slurry 112. In some examples, the cathode slurry 112 may have a solids content in a range of 35-75%. In some examples, the cathode slurry 112 may have a solids content in a range of 40-70%. In some examples, the cathode slurry 112 may have a solids content in a range of 45-65%.

The binder 105 may be a single material or a plurality of materials. The binder 105 is not particularly limited in composition and may be any known by one of ordinary skill in the art. For example, the binder 105 may be polyvinylidene fluoride (PVDF). In some examples, the binder 105 may be selected to substantially dissolve in the solvent 106 (for example, the binder 105 may be PVDF and the solvent 106 may be NMP).

The binder 105 may be in the form of particulates or particles. The binder 105 particles may have a range of sizes or may be close in size. In some examples, the binder 105 particles may have a D50 size range of 100 nm to 10 μm. In some examples, the binder 105 particles may have a D50 size range of about 3 μm.

The binder 105 may be up to 5% of the physical solids in a finally-formed cathode slurry, such as the cathode slurry 112. In some examples, the binder 105 may be 0.01-5% of the physical solids in the cathode slurry 112. In some examples, the binder 105 may be 0.5-5% of the physical solids in the cathode slurry 112. In some examples, the binder 105 may be 0.5-3% of the physical solids in the cathode slurry 112. In some examples, the binder 105 may be 0.5-2% of the physical solids in the cathode slurry 112. In some examples, the binder 105 may be 1-3% of the physical solids in the cathode slurry 112. In some examples, the binder 105 may be 1-2% of the physical solids in the cathode slurry 112.

Thus, the cathode slurry 112 may be a solution or mixture of the surface-doped cathode active material 103 (formed via the salt-rinse surface doping process 108), the conductive additive 104, and the binder 105 in the solvent 106. In some examples, the cathode slurry 112 may have a concentration of 0.01-99.9% solids. In some examples, the cathode slurry 112 may have a concentration of 10-90% solids. In some examples, the cathode slurry 112 may have a concentration of 20-80% solids. In some examples, the cathode slurry 112 may have a concentration of 30-70% solids. In some examples, the cathode slurry 112 may have a concentration of 40-60% solids. In some examples, the cathode slurry 112 may have a concentration of 0.01-50% solids. In some examples, the cathode slurry 112 may have a concentration of 0.01-40% solids. In some examples, the cathode slurry 112 may have a concentration of 0.01-30% solids. In some examples, the cathode slurry 112 may have a concentration of 0.01-20% solids. In some examples, the cathode slurry 112 may have a concentration of 0.01-10% solids. In some examples, the cathode slurry 112 may have a concentration of 60-99.9% solids. In some examples, the cathode slurry 112 may have a concentration of 70-99.9% solids. In some examples, the cathode slurry 112 may have a concentration of 80-99.9% solids. In some examples, the cathode slurry 112 may have a concentration of 90-99.9% solids.

In some examples, the surface-doped cathode active material 103, the conductive additive 104, and the binder 105 may be mixed in the solvent 106 in a Thinky cup or other vessel. In other examples, mixing may be performed on a larger scale (e.g., planetary or rotary blade mixing). In some examples, mixing may be conducted for 5 min. In other examples, mixing may be conducted for another duration of time. As an example, mixing may be conducted for 1 min. As another example, mixing may be conducted for 10 min. As another example, mixing may be conducted for 30 min. As another example, mixing may be conducted for 60 min. In some examples, mixing may be conducted at 2000 RPM. In other examples, mixing may be conducted at another speed of mixing. As an example, mixing may be conducted at 1000 RPM. As another example, mixing may be conducted at 1500 RPM. As another example, mixing may be conducted at 2500 RPM. A type of vessel and process of mixing used is not particularly limited and may be any known to one of ordinary skill in the art.

In some examples of the cathode slurry manufacturing process 110, the cathode slurry 112 may be deposited, or cast, onto a conductive substrate (also referred to herein as a "current collector" or a "cathode current collector") to form a slurry-coated conductive substrate 114. The current collector thereof may be a metal foil, such as aluminum foil. In some examples, the current collector may be aluminum foil and may have a thickness of 1-20 μm. In some examples, the current collector may be aluminum foil and may have the thickness of 10 μm. The cathode slurry 112 may be cast at a predetermined thickness, and may be cast using a slot-die coater, a doctor blade method, or other method. The cathode slurry 112 may be cast with a drawdown applicator and may be cast on an automatic drawdown table.

In some examples, after the cathode slurry 112 is deposited onto the current collector to form the slurry-coated conductive substrate 114, the solvent 106 may be dried off, or evaporated, with gentle heating. The gentle heating may include heating the slurry-coated conductive substrate 114 to a heating temperature of less than 200° C. In additional or alternative examples, the gentle heating may include a steady ramping of the heating temperature to a maximum temperature of less than 200° C. Higher heating temperatures (e.g., greater than 200° C.) may be less desirable, as individual polymers (e.g., of the binder 105) may melt together or begin decomposition during heating. A dried film, or coating, formed therefrom may be calendered to a predetermined density. After evaporation of the solvent 106 and calendering, the cathode 116 may be formed. Thus, the cathode slurry manufacturing process 110 may include mixing the surface-doped cathode active material 103, the conductive additive 104, and the binder 105 in the solvent 106 to form the cathode slurry 112, coating the cathode slurry 112 onto the conductive substrate to form the slurry-coated conductive substrate 114, drying the slurry-coated conductive substrate 114, and compressing, or calendering, the dried film. It will be appreciated that, within the cathode slurry manufacturing process 110, additional additives or processes may be included or removed or substantially altered as contemplated by one of ordinary skill in the art.

The cathode 116 may be suitable for assembly into a lithium-ion cell assembly 126. A process of forming the lithium-ion cell assembly 126 may include pairing the cathode 116 with a corresponding anode 120, and interposing a separator 118 therebetween. The anode 120 may include an anode active material. In some examples, the anode active material may include one or more lithium insertion anode materials. For example, the anode active material may include one or more of lithium metal, graphite, graphene, LTO ($Li_4Ti_5O_{12}$), silicon, a silicon oxide ($SiO_x$), tin, or a tin oxide ($SnO_x$). The separator 118 may serve to separate the cathode 116 and the anode 120 so as to avoid physical contact therebetween. The separator 118 may have high porosity, excellent stability in an electrolytic solution, and excellent liquid-holding properties. Exemplary materials for the separator 118 may be selected from nonwoven fabrics or porous films made of polyolefins, such as polyethylene and/or polypropylene, or ceramic-coated polymer materials. Other materials may be used for the separator 118 as known to one of ordinary skill in the art.

In other examples, the salt-rinse surface doping process 108 may instead be applied to the anode active material, such as LTO. It will be appreciated by those of at least ordinary skill in the art that the cathode slurry manufacturing process 110 may be readily adapted to manufacturing of the anode 120 (for example, by selecting an anode active material in place of the cathode active material 102, and a conductive additive and a binder suitable for an anodic configuration in place of the conductive additive 104 and the binder 105).

The cathode 116, the separator 118, and the anode 120 may be placed within a hermetically-sealed cell housing 122, which may include a pouch or a can, or any other type of battery housing as known to one of ordinary skill in the art.

The lithium-ion cell assembly 126 may then be filled with an electrolyte 124 to produce a filled lithium-ion cell 128. The electrolyte 124 may support transport of ions between the cathode 116 and the anode 120, and may be in intimate contact with other components of the filled lithium-ion cell 128. The electrolyte 124 may include one or more lithium salts, organic solvents, such as organic carbonates, and additives. The electrolyte 124 may be present throughout the filled lithium-ion cell 128 and may be in physical contact with each of the cathode 116, the separator 118, and the anode 120.

The filled lithium-ion cell 128 may then undergo cell formation, also referred to as a first charge/discharge cycle, to form the lithium-ion cell 130 (also referred to herein as a "lithium-ion battery" or "lithium secondary battery"). The lithium-ion cell 130 may be a fully fabricated and complete battery cell that is ready for use and insertion in the lithium-ion battery pack 132 in conjunction with other similarly fabricated lithium-ion cells 130. The lithium-ion cell 130 may store energy as a chemical potential in the electrodes (e.g., the cathode 116 and the anode 120) therein, the electrode configured to reversibly convert between chemical and electrical energy via reduction-oxidation reactions.

In this way, the lithium-ion battery pack 132 may be fabricated wherein the salt-rinse surface doping process 108 may be employed in the cathode slurry manufacturing process 110 forming the cathode 116 of at least one lithium-ion cell 130 of the lithium-ion battery pack 132. In some examples, the lithium-ion battery pack 132 may include one or more lithium-ion cells 130, wherein each of the one or more lithium-ion cells 130 may include the cathode 116 formed via the cathode slurry manufacturing process 110, the separator 118, the anode 120, and the electrolyte 124. Specifically, the cathode slurry manufacturing process 110 may begin by first rinsing the cathode active material 102 with the dopant salt rinse solution 101 followed by heating to form the surface-doped cathode active material 103. The surface-doped cathode active material 103, the conductive additive 104, and the binder 105 may then be mixed in the solvent 106 to form the cathode slurry 112, which may be subsequently applied to the cathode current collector, dried, and calendered to form the cathode 116. In some examples, the lithium-ion battery pack 132 may include a plurality of lithium-ion cells 130, where each of the plurality of lithium-ion cells 130 may be of a same configuration.

In some examples, the lithium-ion battery pack 132 may be arranged in a device, and may further be configured for use in the device, where the device may be an electric vehicle, a hybrid-electric vehicle, a cell phone, a smartphone, a global positioning system (GPS), a tablet device, or a computer.

Figure 2:
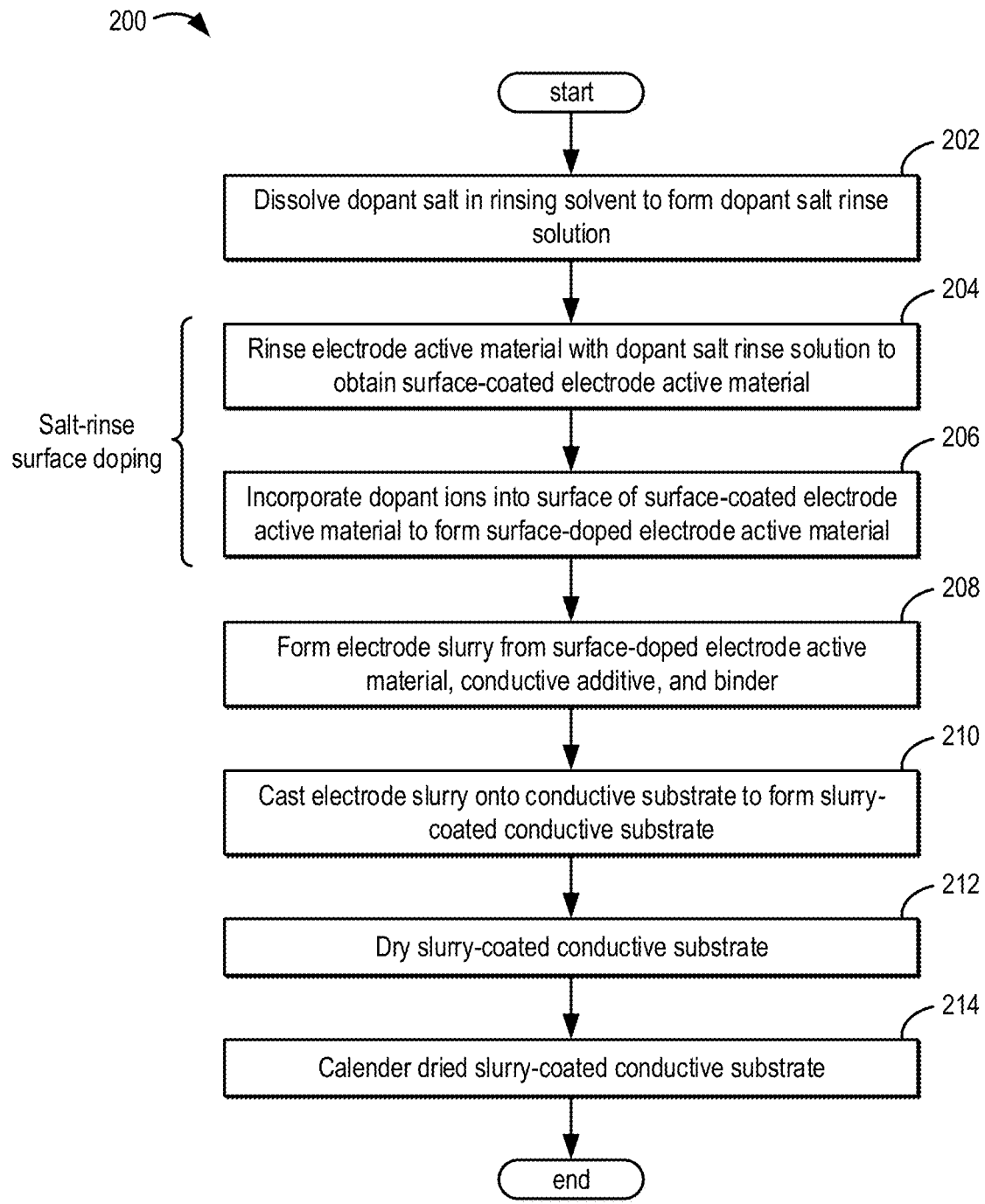
FIG. 2 shows a flow chart of a method for forming an electrode including a surface-doped electrode active material doped via a salt-rinse doping process.

Referring now to FIG. 2, a flow chart of a method 200 is depicted for an electrode slurry manufacturing process for forming an electrode, wherein the electrode slurry manufacturing process employs a salt-rinse surface doping process. As shown, the salt-rinse surface doping process may be inclusive of 204 and 206. However, it will be appreciated that steps of the salt-rinse surface doping process may be added, removed, substituted, or otherwise altered within the scope of the present disclosure. It will be appreciated that the method 200 may be described in relation to the components described above with reference to FIG. 1. For example, the dopant salt rinse solution may be the dopant salt rinse solution 101, the electrode active material may be the cathode active material 102, the surface-doped electrode active material may be the surface-doped cathode active material 103, the salt rinse surface doping process may be the salt-rinse surface doping process 108, and the electrode slurry manufacturing process may be the cathode slurry manufacturing process 110.

At 202, the method 200 may include dissolving the dopant salt in the rinsing solvent to form the dopant salt rinse solution. In some examples, the dopant salt may be a transition metal salt. In some examples, the dopant salt may include Al, Mg, Mn, Co, Ni, Ti, Zr, W, F, B, or a combination thereof. In some examples, the rinsing solvent may be deionized water. In some examples, the dopant salt may be selected to include a cation, such as a transition metal cation, which may form a salt with $OH^-$ or $CO_3^{2-}$ having lower solubility than LiOH or $Li_2CO_3$. In additional or alternative examples, the dopant salt may be selected to include an anion, such as $NO_3^-$, which may form a salt with $Li^+$ having higher solubility than LiOH or $Li_2CO_3$. In other examples, the salt formed from $Li^+$ and the anion of the dopant salt may have a lower solubility than LiOH or $Li_2CO_3$ (however, in such examples, the salt formed from $Li^+$ and the anion of the dopant salt may still have a high enough solubility to substantially dissolve in the rinsing solvent). It will be appreciated that other rinsing solvents, such as organic solvents, may be used within the scope of the present disclosure. For example, a suitable rinsing solvent may dissolve both the dopant salt and the salt formed from the dopant salt anion and $Li^+$.

In some examples, an amount or weight of the dopant salt may be selected based on an amount of residual lithium salts in the electrode active material to be rinsed. In additional or alternative examples, the weight of the dopant salt may be selected based on a weight of the electrode active material. For example, the weight of the dopant salt may be about 1% to 3% the weight of the electrode active material. In some examples, the amount of the dopant salt may be selected based on an intended surface doping amount (for example, about 0.1 to 2 mol % of the electrode active material).

At 204, the method 200 may include rinsing the electrode active material with the dopant salt rinse solution to obtain a surface-coated electrode active material. Accordingly, in some examples, the dopant salt rinse solution may be formed prior to obtaining a pristine (dry) electrode active material. As discussed below with reference to FIGS. 3 and 4, sequential formation of the dopant salt rinse solution followed by rinsing the pristine electrode active material may be desired for uniform distribution of dopant ions in a surface region of the electrode active material.

The electrode active material may be a cathode active material or an anode active material. In some examples, the cathode active material may be an NMC, such as a high-Ni NMC. For instance, the high-Ni NMC may have a molar content of nickel of 60% or greater of a total molar content of nickel, manganese, and cobalt. In some examples, the high-Ni NMC mat have the molar content of nickel of 70% or greater of the total molar content of nickel, manganese, and cobalt. As an example, the cathode active material may include Ni-83 NMC, where Ni-83 NMC may be characterized by the molar content of nickel being 83% of the total molar content of nickel, manganese, and cobalt. As another example, the cathode active material may include Ni-87 NMC, where Ni-87 NMC may be characterized by the molar content of nickel being 87% of the total molar content of nickel, manganese, and cobalt. As yet another example, the cathode active material may include Ni-88 NMC, where Ni-88 NMC may be characterized by the molar content of nickel being 88% of the total molar content of nickel, manganese, and cobalt.

Rinsing the electrode active material with the dopant salt rinse solution may include mixing the electrode active material with the dopant salt rinse solution to form a mixture. In some examples, the mixture may be stirred for a rinsing duration at a predetermined stirring speed. For example, the mixture may be stirred at about 500 rpm for a rinsing duration of 5 min. In some examples, the rinsing duration may be minimized to decrease cost by increasing efficiency of the overall process.

During mixing, the dopant salt may be precipitated by a residual lithium salt at a surface of the electrode active material, such that a dopant precipitate may be formed from the cation of the dopant salt and an anion of the residual lithium salt. As a result, the dopant precipitate may uniformly coat the surface of the electrode active material to form the surface-coated electrode active material. Accordingly, in some examples, the predetermined stirring speed may be selected such that substantially all of the dopant salt is precipitated at the surface of the electrode active material.

Specifically, rinsing the electrode active material with the dopant salt rinse solution may further include filtering the mixture to isolate a filtrate. In some examples, the mixture may be transferred to a filtration flask coupled to a vacuum pump, whereby excess rinsing solvent may be filtered from the mixture. Following filtration, the isolated filtrate may include a cake including a small portion of the rinsing solvent and the surface-coated electrode active material.

Rinsing the electrode active material with the dopant salt rinse solution may further include drying the filtrate. In some examples, the filtrate may be dried in a vacuum oven at a relatively low drying temperature until the rinsing solvent is substantially evaporated. For example, the filtrate may be dried at the drying temperature of 120° C. or less for a drying duration of less than 24 hours. In additional or alternative examples, the drying temperature may be 80° C. or less. In additional or alternative examples, the drying duration may be greater than one hour, such as about 8 to 20 hours. In some examples, a rotating tank may be utilized to further decrease the drying duration. The filtrate may be considered dry when substantially all of the rinsing solvent has evaporated. Following drying, the dried filtrate may include the surface-coated electrode active material. Accordingly, in some examples, the only drying included in the salt-rinse surface doping process is drying of the filtrate in a single step or stage.

In a typical, two-stage rinsing and doping process, two separate drying steps may be employed: one drying step to evaporate a rinsing solvent and one drying step to evaporate a solvent of a dopant solution. However, and as discussed below with reference to FIGS. 5 and 6, excessive drying in the typical, two-stage rinsing and doping process may jeopardize an integrity of a crystal structure of the electrode active material, resulting in increased particle cracking relative to the salt-rinse surface doping process of the present disclosure.

Further, in certain processes, an additional rinsing step may be employed following doping of the electrode active material (e.g., at 204). However, such additional rinsing may increase an overall cost (e.g., more chemicals involved) and processing time for forming the surface-doped electrode active material. Accordingly, in some examples, no further rinsing may be employed following doping of the electrode active material (e.g., no further rinsing may be employed at 206 to 214).

At 206, the method 200 may include incorporating (intercalating, inducing, etc.) dopant ions into a surface of the surface-coated electrode active material to form the surface-doped electrode active material. In some examples, and as described below, incorporation of the dopant ions may be accomplished via heating (sintering, calcining, etc.), of the surface-coated electrode active material such that cations of the uniformly coated dopant precipitate diffuse into the surface of the surface-coated electrode active material. However, as other processes may be utilized to promote dopant ion incorporation within the scope of the present disclosure (such as high-pressure doping techniques, electrochemical doping techniques, etc.), the below-described processes should not be taken as particularly limiting.

In some examples, incorporating the dopant ions into the surface of the surface-coated electrode active material may include heating the dried filtrate to a sintering temperature. In some examples, the dried filtrate may be transferred to a box furnace, where a temperature therein may be ramped to the sintering temperature at a temperature ramping rate of 5° C./min in a sintering atmosphere of air, $CO_2$-free air, oxygen, or a combination thereof.

Incorporating the dopant ions into the surface of the surface-coated electrode active material may further include sintering the dried filtrate at the sintering temperature. In some examples, the sintering temperature may be 300° C. or greater. In some examples, the sintering temperature may be 550° C. or greater. In some examples, the sintering temperature may be 650° C. or greater. In some examples, the surface-coated electrode active material may be sintered at the sintering temperature for a sintering duration sufficient to incorporate the dopant ions into the surface of the electrode active material (for example, 5 hrs).

Incorporating the dopant ions into the surface of the surface-coated electrode active material may further include cooling the sintered dried filtrate. For example, the box furnace may be naturally cooled to room temperature. Following the cooling, the surface-doped electrode active material may be obtained. In this way, the single-stage, salt-rinse surface doping process of the present disclosure may supplant the typical, two-stage rinsing and doping process to form a surface-doped electrode active material having both desirable structural stability and electrochemical performance properties.

At 208, the method 200 may include mixing the surface-doped electrode active material, a conductive additive, and a binder into a solvent to form and obtain an electrode slurry. The solvent may be different from the rinsing solvent. It will be appreciated the surface-doped electrode active material may include one or more surface-doped electrode active materials, the conductive additive may include one or more conductive additives, and the binder may include one or more binders. Amounts of the surface-doped electrode active material, the conductive additive, and the binder may be respectively selected to control for the viscosity and thereby the solids content of the electrode slurry. In one example, the solids content of the electrode slurry may include 93 wt. % of the surface-doped electrode active material, 4 wt. % of the conductive additive, and 3 wt. % of the binder.

At 210, the method 200 may include casting the electrode slurry onto the conductive substrate to form the slurry-coated conductive substrate. In some examples, the conductive substrate may include a metal foil, e.g., aluminum foil. Numerous slurry-based coating processes may be utilized without departing from the scope of the present disclosure, including, but not limited to, slot-die coating, roll-to-roll coating (e.g., gravure coating, screen printing, flexographic printing), doctor-blade casting, tape casting, spray (aerosol) coating, reverse comma coating, etc.

At 212, the method 200 may include drying the slurry-coated conductive substrate. Drying the slurry-coated conductive substrate may include evaporating the solvent at a relatively low temperature (for example, 200° C. or less).

At 214, the method 200 may include calendering the dried slurry-coated conductive substrate. In this way, the electrode may be formed via the electrode slurry manufacturing process, where the electrode slurry manufacturing process employs the salt-rinse surface doping process for forming a surface-doped electrode active material.

Figure 3:
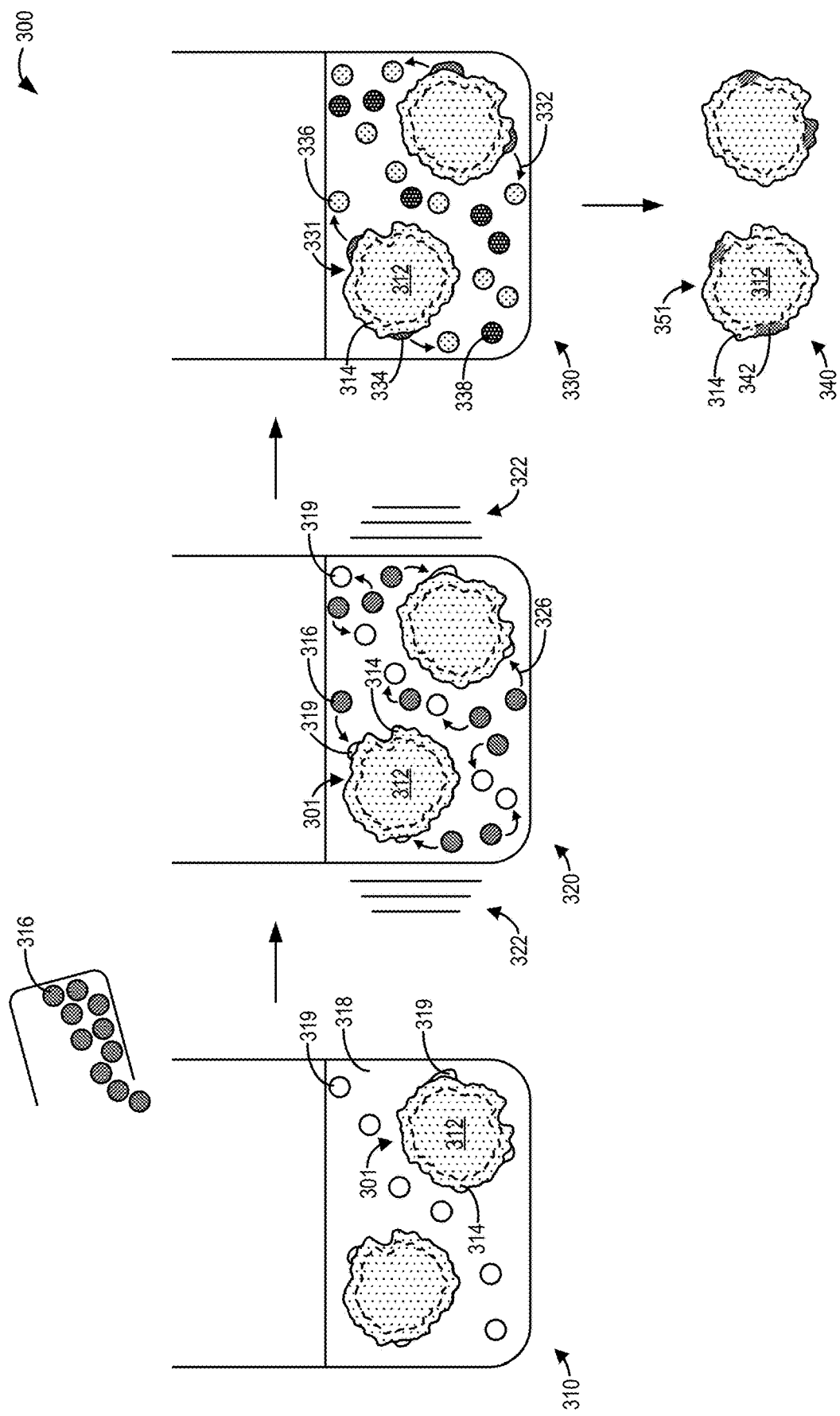
FIG. 3 shows a schematic diagram of a typical rinsing and doping process for an electrode active material.

Referring now to FIG. 3, a schematic diagram 300 is depicted showing a typical rinsing and doping process of electrode active material particles 301. In the typical rinsing and doping process, the electrode active material particles 301 may be retained in, or mixed with, a solvent 318 prior to addition of a dopant salt 316. Once added to the solvent 318, at least some of the dopant salt 316 may precipitate substantially immediately in solution (due to dissolved residual lithium salts 319 in the solvent 318), which may result in incomplete doping of a surface region 314 of the electrode active material particles 301.

At first exemplary step 310, a container including the electrode active material particles 301 dispersed in the solvent 318 may be obtained. The electrode active material particles 301 may be composed of a cathode active material, such as NMC. Further, excess residual lithium salt 319, such as lithium carbonate and/or lithium hydroxide, may be retained on surfaces of the electrode active material particles 301 from a synthesis process thereof. Moreover, as a result of the electrode active material particles 301 being dispersed in the solvent 318, the residual lithium salt 319 may be at least partially dissolved in the solvent 318. As shown, each given electrode active material particle 301 may include a volume partitioned into a core region 312 and the surface region 314.

As further shown at first exemplary step 310, the (dry) dopant salt 316 may be added to the container. The dopant salt 316 may be a metal salt including a metal cation and an anion, for example.

Once added, at second exemplary step 320, the container may be agitated 322 to promote reaction of the dopant salt 316 the residual lithium salt 319 (as indicated by directional arrows 326). Accordingly, at third exemplary step 330, a lithium salt 336 may be formed (as a precipitate or dissolved in the solvent 318, as indicated by directional arrows 332, and/or as a layer at the surface regions 314) while a dopant precipitate 334 may be formed from a cation of the dopant salt 316 and an anion of the residual lithium salt 319. However, at least a portion of the dopant salt 316 may substantially immediately precipitate as a visible (opaque) hydroxide or carbonate salt 338 in solution as a result of at least a portion of the residual lithium salt 319 already being present in the solvent 318 (due to the at least partial dissolution of the residual lithium salt 319 prior to addition of the dopant salt 316).

Since the residual lithium salt 319 was present on only portions of surfaces of the electrode active material particles 301, in some examples, the dopant precipitate 334 may precipitate in large agglomerations on those portions to form pre-sintered electrode active material particles 331. In such examples, when the pre-sintered electrode active material particles 331 are isolated and sintered, as shown at fourth exemplary step 340, only some portions of the surface regions 314 may be (non-uniformly) doped with dopant ions 342 from the dopant salt 316 to form surface-doped electrode active material particles 351. Further, in examples wherein the lithium salt 336 remains at the surface regions 314, or in examples wherein the surface-doped electrode active material particles 351 are dried without filtration, significant residual lithium may still remain at the surface regions 314 (as the residual lithium may settle on the surfaces of the surface-doped electrode active material particles 351 during drying).

Figure 4:
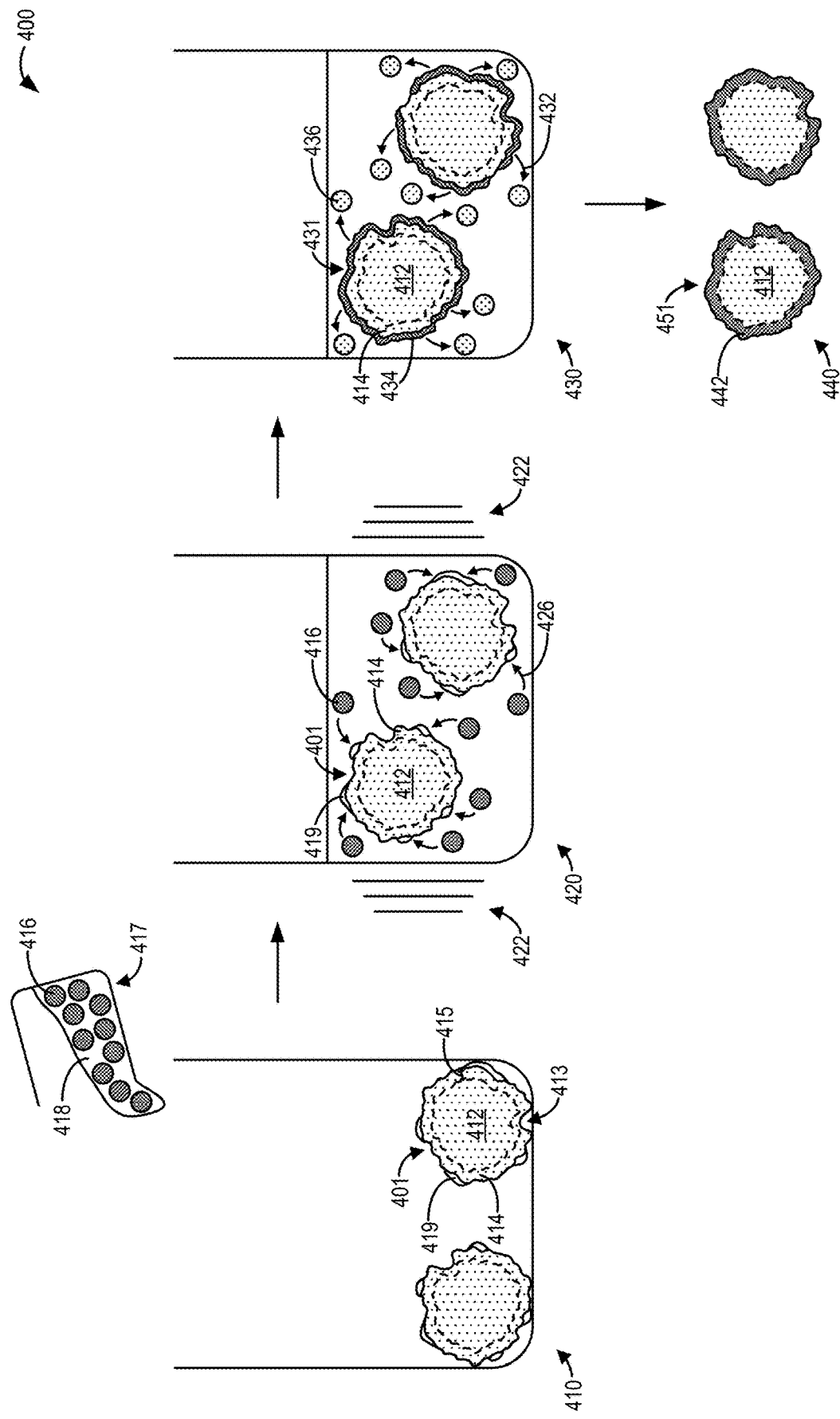
FIG. 4 shows a schematic diagram of the salt-rinse doping process for forming the surface-doped electrode active material.

Referring now to FIG. 4, a schematic diagram 400 is depicted showing a salt-rinse surface doping process of electrode active material particles 401. In the salt-rinse surface doping process, dried electrode active material particles 401 may be added to a dopant salt rinse solution 417, whereby a dopant salt 416 dissolved in the dopant salt rinse solution 417 may be uniformly surface doped into a surface region 414 of the electrode active material particles 401. It will be appreciated that the method 200 may be described in relation to the components described above with reference to FIG. 1. For example, the dopant salt rinse solution 417 may be the dopant salt rinse solution 101, the electrode active material particles 401 may be composed of the cathode active material 102, and surface-doped electrode active material particles 451 may be composed of the surface-doped cathode active material 103.

At first exemplary step 410, a container including the electrode active material particles 401 may be obtained. The electrode active material particles 401 may be pristine and dry (that is, substantially free of solvents) and may be composed of a cathode active material, for example, such as NMC. Further, excess residual lithium salt 419, such as lithium carbonate and/or lithium hydroxide, may be retained on surfaces of the electrode active material particles 401 from a synthesis process thereof.

As shown, each given electrode active material particle 401 may include a volume partitioned into a core region 412 and the surface region 414. In some examples, the core region 412 may include a larger volume than the surface region 414. In some examples, the surface region 414 may extend to a threshold depth 415 towards a center of the given electrode active material particle 401. That is, the threshold depth 415 may be a maximum possible extent, or depth, of the surface region 414 in a direction towards the center of the given electrode active material particle 401. In some examples, a depth of at least one portion of the surface region 414 may vary from a depth of at least one other portion of the surface region 414.

In some examples, the threshold depth 415 may be substantially equal to a radius of the given electrode active material particle 401. In some examples, the given electrode active material particle 401 may have no, or substantially no, core region 412. In some examples, the threshold depth 415 may be 10 μm. In some examples, the threshold depth 415 may be 5 μm. In some examples, the threshold depth 415 may be 2 μm. In some examples, the threshold depth 415 may be 1 μm. In some examples, the threshold depth 415 may be 500 nm. In some examples, the threshold depth 415 may be 100 nm.

In some examples, any given electrode active material particle 401 may include one or more surface structures 413 disposed on an exterior of the given electrode active material particle 401. Such surface structures 413 may be openings within the surface region 414 of the given electrode active material particle 401. The size and depth of the surface structures 413 may respectively vary. In some examples, the surface structures 413 may be irregular such that the surface structures 413 may have different shapes and sizes. The surface structures 413 may increase a surface area of the given electrode active material particle 401. In this way, a wet, salt-rinse surface doping process may dope portions of the surface region 414, such as the surface structures 413, which may be more difficult to dope with a dry surface doping process.

In some examples, an average particle size of the electrode active material particles 401 may be at least 0.5 μm and at most 20 μm. In some examples, a size distribution of the electrode active material particles 401 may be a normal distribution. In some examples, the electrode active material particles 401 may be larger, secondary particles composed of smaller, primary particles. For example, the secondary particles may be substantially spherical aggregations of irregularly-shaped primary particles, such that the surface structures 413 may be formed between the irregularly-shaped primary particles.

As further shown at first exemplary step 410, the dopant salt rinse solution 417 may be added to the container. The dopant salt rinse solution 417 may include the dopant salt 416 dissolved in a solvent 418. The solvent 418 may be deionized water and the dopant salt 416 may be a metal salt including a metal cation and an anion, for example.

Once added, at second exemplary step 420, the container may be agitated 422 to promote reaction of the dopant salt 416 with the residual lithium salt 419 (as indicated by directional arrows 426). Accordingly, at third exemplary step 430, a lithium salt 436 may be formed, which may dissolve into the solvent 418 (as indicated by directional arrows 432), while a dopant precipitate 434 may be formed from a cation of the dopant salt 416 and an anion of the residual lithium salt 419.

As a result of a sequence of the first, second, and third exemplary steps 410, 420, 430, the dopant precipitate 434 may be more uniformly distributed at the surfaces of the electrode active material particles 401 in the salt-rinse surface doping process schematically depicted by FIG. 4 than are dopant precipitates in the typical rinsing and doping process schematically depicted by FIG. 3. Specifically, when the precipitation reaction occurs substantially entirely at the surface regions 414, the dopant precipitate 434 may form at the surface regions 414 from ion exchange between the dopant salt 416 and the residual lithium salt 419, replacing the residual lithium salt 419 with substantial uniformity. Thus, a uniform precipitate coating may form at the surface regions 414 of the electrode active material particles 401 to form coated electrode active material particles 431. In some examples, the uniform precipitate coating may coat at least a portion of the surface regions 414. In some examples, the uniform precipitate coating may substantially fully coat the surface regions 414. In some examples, the uniform precipitate coating substantially fully coating the surface regions 414 may include leaving relatively small portions of the surface regions 414 uncovered by the dopant precipitate 434. However, in other examples, the uniform precipitate coating substantially fully coating the surface regions 414 may include entirely covering the surface regions 414 with the dopant precipitate 434.

Accordingly, when the coated electrode active material particles 431 are isolated and heated, as shown at fourth exemplary step 440, the surface regions 414 may be uniformly doped with dopant ions 442 (for example, metal cations from the dopant salt 416), such that surface-doped electrode active material particles 451 may be formed. In some examples, a gradient structure may be formed, wherein an increased amount of the dopant ions 442 may be uniformly doped in portions of the surface region 414 nearer the (outer) surface of a given surface-doped electrode active material particle 451 than portions of the surface region 414 nearer the core region 412 of the given surface-doped electrode active material particle 451. Further, even in cases where relatively small portions of the surface regions 414 remain uncovered by the dopant precipitate 434 following rinsing with the dopant salt rinse solution 417, the heating may in some examples induce migration of the dopant ions 442 from adjacent portions of the surface regions 414 which are covered to the relatively small portions of the surface regions 414 which remain uncovered. In this way, a more uniform distribution of dopant ions from a dopant salt may be doped throughout surface regions of surface-doped electrode active material particles via the (single-stage) salt-rinse surface doping process than in the typical (two-stage) rinsing and doping process.

Figure 5:
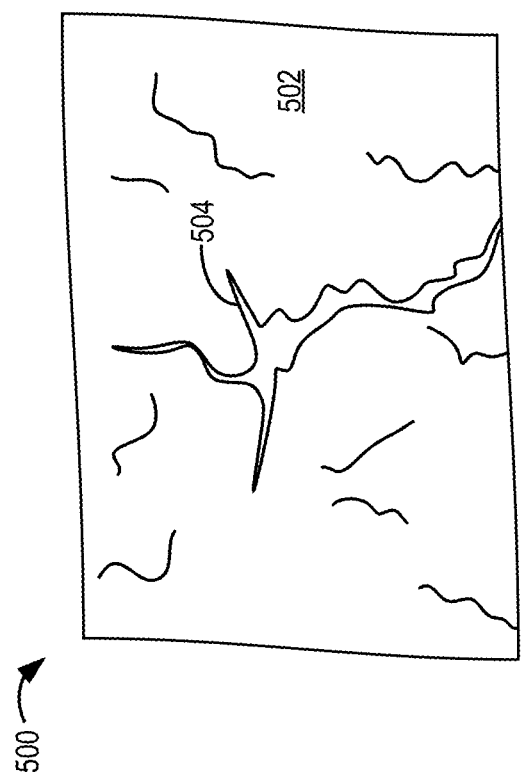
FIG. 5 shows a schematic diagram of a portion of a surface of a surface-doped electrode active material formed via a typical rinsing and doping process.

Referring now to FIG. 5, a schematic diagram 500 is depicted showing a portion of a surface 502 of a surface-doped electrode active material formed via a typical rinsing and doping process. Because the typical rinsing and doping process includes at least two drying steps, degradation to the surface 502 may be exacerbated, compromising the crystal structure of the surface-doped electrode active material. As shown, extensive cracking 504 may result, which may result in a poor cycle life of a finally-formed lithium-ion cell incorporating the surface-doped electrode active material.

Figure 6:
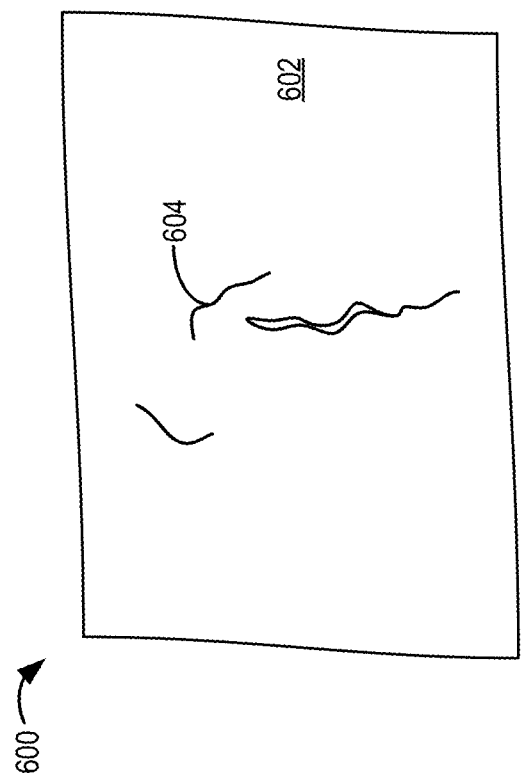
FIG. 6 shows a schematic diagram of a portion of a surface of a surface-doped electrode active material particle formed via the salt-rinse doping process.

Referring now to FIG. 6, a schematic diagram 600 is depicted showing a portion of a surface 602 of a surface-doped electrode active material formed via a salt-rinse surface doping process. The salt-rinse surface doping process, employing one drying step, may minimize degradation to the surface 602. As compared to the schematic diagram 500 of FIG. 5, much less cracking 604 results on the surface 602 from the salt-rinse surface doping process than from the typical rinsing and doping process. In additional or alternative examples, undesirable phase transitions (for example, between layered and spinel phases) may be minimized or delayed when $Li^+$ is removed from the surface 602 prior to sintering or doping, which may result in better maintained crystal structure of the surface-doped electrode active material and improved cycle life of a finally-formed lithium-ion cell. In this way, the salt-rinse surface doping process may improve cycling of a finally-formed lithium-ion cell incorporating the surface-doped electrode active material relative to the surface-doped electrode active material formed from the typical rinsing and doping process.

Referring now to FIGS. 7-13, various aspects of electrochemical performance of coin cells including pristine, rinsed, and surface-doped Ni-83 NMCs (FIGS. 7-10) and pristine, rinsed, and surface-doped Ni-87 NMCs (FIGS. 11-13) are characterized. The pristine NMCs were prepared with no rinsing or doping process, the rinsed NMCs were prepared with a rinsing process and no doping process, and the surface-doped NMCs were prepared with a salt-rinse surface doping process. To prepare a cathode for coin cell testing (as shown by FIGS. 8-10, 12, and 13), 93 wt. % pristine NMC, rinsed NMC, or surface-doped NMC, 4 wt. % carbon conductive additives, and 3 wt. % PVDF binder were mixed in a Thinky mixer for 5 min at 2000 RPM three times. A resultant slurry was cast on aluminum foil at an active mass loading of about 7 mg/cm$^2$. After drying the casted cathode in a vacuum over at 120° C. for 2 hrs, the casted electrode was calendered to a density of 3.2 g/cm³ to obtain a final cathode. Type-2025 coin cells were assembled with the final cathode, a lithium anode, a Celgard® 2500 membrane separator, and an electrolyte. The electrolyte was 1 M $LiPF_6$ in a mixture of ethylene carbonate and diethyl carbonate solvents, where a volume to volume ratio of the solvents was 1:2. It will be appreciated that the results of FIGS. 7-13 may be extendible to commercial Li-ion batteries, such as 350 Wh/kg batteries, 325 Wh/kg batteries, or lower-energy density batteries (for example, 200 Wh/kg batteries).

Referring now to FIG. 7, plot 700 depicts residual lithium amounts in samples of pristine (undoped) Ni-83 NMC, rinsed (undoped) Ni-83 NMC, 2 mol % Nd surface-doped Ni-83 NMC, 2 mol % Y surface-doped Ni-83 NMC, 2 mol % Ce surface-doped Ni-83 NMC, 2 mol % La surface-doped Ni-83 NMC, 2 mol % Mg surface-doped Ni-83 NMC, 2 mol % Co surface-doped Ni-83 NMC, and 2 mol % Mn surface-doped Ni-83 NMC. The residual lithium amounts were evaluated with a titration approach via a Metrohm 855 Robotic Titrosampler. Specifically, each given Ni-83 NMC sample was mixed in deionized water by stirring for 30 min before being diluted for titration. A volume of 0.1 M HCl was used to determine concentrations of $CO_3^{2-}$, $HCO_3^-$, and $OH^-$ in solution, wherefrom the amounts (weights) of residual $Li_2CO_3$ and LiOH at surfaces of the given Ni-83 NMC sample were calculated. An amount (weight) of residual free Li' may further be determined as a combined amount of $Li^+$ in $Li_2CO_3$ and LiOH (that is, not including $CO_3^{2-}$ and $OH^-$). As shown, the residual lithium amounts (in ppm) are represented by an ordinate and the Ni-83 NMC samples are indicated along an abscissa.

Bars 701, 702, and 703 plot the amount of the residual $Li_2CO_3$, the amount of the residual LiOH, and the amount of the residual free $Li^+$, respectively. As shown in the plot 700, the pristine (undoped) Ni-83 NMC sample includes a relatively high amount of each of the residual $Li_2CO_3$ and the residual free $Li^+$ as compared to other Ni-83 NMC samples tested. As exemplified by the rinsed (undoped) Ni-83 NMC sample, the rinsing process significantly reduced the amount of each of the residual $Li_2CO_3$ and the residual free $Li^+$. As further exemplified by the surface-doped Ni-83 NMC samples, the rinsing and doping process similarly reduced the amount of each of the residual $Li_2CO_3$ and the residual free $Li^+$ to a comparable level to the rinsed (undoped) Ni-83 NMC sample, where the Co and Mn surface-doped Ni-83 NMC samples even outperform the rinsed (undoped) Ni-83 NMC sample.

Referring now to FIG. 8, plots 800 and 850 depict FCCs and FDCs, respectively, of coin cells incorporating samples of pristine (undoped) Ni-83 NMC, rinsed (undoped) Ni-83 NMC, 2 mol % Ce surface-doped Ni-83 NMC, 2 mol % Co surface-doped Ni-83 NMC, 2 mol % La surface-doped Ni-83 NMC, 2 mol % Mg surface-doped Ni-83 NMC, 2 mol % Mn surface-doped Ni-83 NMC, 2 mol % Nd surface-doped Ni-83 NMC, and 2 mol % Y surface-doped Ni-83 NMC. As shown, the FCCs and FDCs (in mAh/g) of plots 800 and 850, respectively, are represented by an ordinate and the Ni-83 NMC samples are indicated along an abscissa.

As shown in the plot 800, the FCC for the pristine (undoped) Ni-83 NMC sample is 234.3 mAh/g, the FCC for the rinsed (undoped) Ni-83 NMC sample is 232.0 mAh/g, the FCC for the 2 mol % Ce surface-doped Ni-83 NMC sample is 223.1 mAh/g, the FCC for the 2 mol % Co surface-doped Ni-83 NMC sample is 237.2 mAh/g, the FCC for the 2 mol % La surface-doped Ni-83 NMC sample is 224.3 mAh/g, the FCC for the 2 mol % Mg surface-doped Ni-83 NMC sample is 223.1 mAh/g, the FCC for the 2 mol % Mn surface-doped Ni-83 NMC sample is 234.8 mAh/g, the FCC for the 2 mol % Nd surface-doped Ni-83 NMC sample is 229.8 mAh/g, and the FCC for the 2 mol % Y surface-doped Ni-83 NMC sample is 224.829 mAh/g, (as shown by plots 801, 802, 803, 804, 805, 806, 807, 808, and 809 respectively). As shown in the plot 850, the FDC for the pristine (undoped) Ni-83 NMC sample is 203.4 mAh/g, the FDC for the rinsed (undoped) Ni-83 NMC sample is 208.8 mAh/g, the FDC for the 2 mol % Ce surface-doped Ni-83 NMC sample is 196.2 mAh/g, the FDC for the 2 mol % Co surface-doped Ni-83 NMC sample is 205.6 mAh/g, the FDC for the 2 mol % La surface-doped Ni-83 NMC sample is 195.0 mAh/g, the FDC for the 2 mol % Mg surface-doped Ni-83 NMC sample is 191.9 mAh/g, the FCC for the 2 mol % Mn surface-doped Ni-83 NMC sample is 209.8 mAh/g, the FDC for the 2 mol % Nd surface-doped Ni-83 NMC sample is 193.8 mAh/g, and the FDC for the 2 mol % Y surface-doped Ni-83 NMC sample is 202.2 mAh/g, (as shown by plots 851, 852, 853, 854, 855, 856, 857, 858, and 859 respectively). As such, the Co and Mn surface-doped Ni-83 NMC samples show comparable FCCs and FDCs to the pristine and rinsed (undoped) Ni-83 NMC samples, whereas each of the Ce, La, Mg, Nd, and Y surface-doped Ni-83 NMC samples show slightly decreased FCCs and FDCs as compared to the pristine and rinsed (undoped) NMC811 samples due to a presence of dopant metal ions.

Referring now to FIG. 9, plot 900 depicts capacity retention over cycling of coin cells incorporating samples of pristine (undoped) Ni-83 NMC (as shown by curve 901), rinsed (undoped) Ni-83 NMC (as shown by curve 902), 1 mol % Nd surface-doped Ni-83 NMC (as shown by curve 903), 2 mol % Nd surface-doped Ni-83 NMC (as shown by curve 904), 2 mol % Mn surface-doped Ni-83 NMC (as shown by curve 905), and 2 mol % Co surface-doped Ni-83 NMC (as shown by curve 906). As shown, the capacity retention (in %) is represented by an ordinate and a total number of cycles is represented by an abscissa.

As shown by the plot 900, the rinsing (undoped) Ni-83 NMC sample performed significantly worse than any other Ni-83 NMC sample due to a surface of the Ni-83 NMC being compromised after contact with water. However, each of the Nd, Mn, and Co surface-doped Ni-83 NMC samples showed enhanced cycle life performance even though the salt-rinse surface doping process involved similar contact with water. The 1 mol % and 2 mol % Nd surface-doped Ni-83 NMC samples even showed improved cycle life performances relative to the pristine (undoped) Ni-83 NMC samples. As such, the plot 900 indicates that introducing dopant metal ions in a rinsing solvent may stabilize a surface of a given NMC sample and thereby improve cycle life.

Referring now to FIG. 10, plot 1000 depicts specific capacities over cycling of coin cells incorporating samples of pristine (undoped) Ni-83 NMC (as shown by curve 1001), rinsed (undoped) Ni-83 NMC (as shown by curve 1002), 1 mol % Nd surface-doped Ni-83 NMC (as shown by curve 1003), 2 mol % Nd surface-doped Ni-83 NMC (as shown by curve 1004), 2 mol % Mn surface-doped Ni-83 NMC (as shown by curve 1005), and 2 mol % Co surface-doped Ni-83 NMC (as shown by curve 1006). As shown, the capacity retention (in %) is represented by an ordinate and a total number of cycles is represented by an abscissa.

As shown by the plot 1000, and similar to the plot 900 described above with reference to FIG. 9, the rinsing (undoped) Ni-83 NMC sample performed significantly worse than any other Ni-83 NMC sample due to a surface of the Ni-83 NMC being compromised after contact with water.

However, each of the Nd, Mn, and Co surface-doped Ni-83 NMC samples showed enhanced cycle life performance even though the salt-rinse surface doping process involved similar contact with water. The 1 mol % Nd surface-doped Ni-83 NMC sample even showed improved cycle life performance relative to the pristine (undoped) Ni-83 NMC samples. As such, the plot 1000 indicates that introducing dopant metal ions in a rinsing solvent may stabilize a surface of a given NMC sample and thereby improve cycle life.

Referring now to FIG. 11, plot 1100 depicts residual lithium amounts in samples of pristine (undoped) Ni-87 NMC, rinsed (undoped) Ni-87 NMC, 1 mol % Nd surface-doped Ni-87 NMC, 1 mol % Y surface-doped Ni-87 NMC, 1 mol % Ce surface-doped Ni-87 NMC, 1 mol % La surface-doped Ni-87 NMC, 1 mol % Mg surface-doped Ni-87 NMC, 2 mol % Co surface-doped Ni-87 NMC, 2 mol % Mn surface-doped Ni-87 NMC, and 1 mol % Al surface-doped Ni-87 NMC. The residual lithium amounts were evaluated with a titration approach via a Metrohm 855 Robotic Titrosampler. Specifically, each given Ni-87 NMC sample was mixed in deionized water by stirring for 30 min before being diluted for titration. A volume of 0.1 M HCl was used to determine concentrations of $CO_3^{2-}$, $HCO_3^-$, and $OH^-$ in solution, wherefrom the amounts (weights) of residual $Li_2CO_3$ and LiOH at surfaces of the given Ni-87 NMC sample were calculated. An amount (weight) of residual free $Li^+$ may further be determined as a combined amount of $Li^+$ in $Li_2CO_3$ and LiOH (that is, not including $CO_3^{2-}$ and $OH^-$). As shown, the residual lithium amounts (in ppm) are represented by an ordinate and the Ni-87 NMC samples are indicated along an abscissa.

Bars 1101, 1102, and 1103 plot an amount of the residual $Li_2CO_3$, an amount of the residual LiOH, and an amount of the residual free $Li^+$, respectively. As shown in the plot 1100, the pristine (undoped) Ni-87 NMC sample includes a relatively high amount of each of the residual $Li_2CO_3$, the residual LiOH, and the residual free $Li^+$ as compared to other Ni-87 NMC samples tested. As exemplified by the rinsed (undoped) Ni-87 NMC sample, the rinsing process significantly reduced the amount of each of the residual $Li_2CO_3$, the residual LiOH, and the residual free $Li^+$. As further exemplified by the surface-doped Ni-87 NMC samples, the rinsing and doping process similarly reduced the amount of each of the residual $Li_2CO_3$, the residual LiOH, and the residual free $Li^+$ to a comparable level to the rinsed (undoped) Ni-87 NMC sample.

Referring now to FIG. 12, plot 1200 depicts capacity retention over cycling of coin cells incorporating samples of pristine (undoped) Ni-87 NMC (as shown by curve 1201), rinsed and sintered (undoped) Ni-87 NMC (as shown by curve 1202), 1 mol % Nd surface-doped Ni-87 NMC (as shown by curve 1203), 1 mol % Y surface-doped Ni-87 NMC (as shown by curve 1204), 1 mol % Ce surface-doped Ni-87 NMC (as shown by curve 1205), 1 mol % Mg surface-doped Ni-87 NMC (as shown by curve 1206), 2 mol % Co surface-doped Ni-87 NMC (as shown by curve 1207), 1 mol % Al surface-doped Ni-87 NMC (as shown by curve 1208), 2 mol % Mn surface-doped Ni-87 NMC (as shown by curve 1209), and 1 mol % La surface-doped Ni-87 NMC (as shown by curve 1210). As shown, the capacity retention (in %) is represented by an ordinate and a total number of cycles is represented by an abscissa.

As shown by the plot 1200, the rinsing and sintered (undoped) Ni-87 NMC sample performed significantly worse than any other Ni-87 NMC sample due to a surface of the Ni-87 NMC being compromised after contact with water. However, each of the surface-doped Ni-87 NMC samples showed enhanced cycle life performance even though the salt-rinse surface doping process involved similar contact with water. The Nd, Al, and Co surface-doped Ni-87 NMC samples even showed improved cycle life performance relative to the pristine (undoped) Ni-87 NMC samples. As such, the plot 1200 indicates that introducing dopant metal ions in a rinsing solvent may stabilize a surface of a given NMC sample and thereby improve cycle life.

Referring now to FIG. 13, plot 1300 depicts specific capacities over cycling of coin cells incorporating samples of pristine (undoped) Ni-87 NMC (as shown by curve 1301), rinsed and sintered (undoped) Ni-87 NMC (as shown by curve 1302), 1 mol % Nd surface-doped Ni-87 NMC (as shown by curve 1303), 1 mol % Y surface-doped Ni-87 NMC (as shown by curve 1304), 1 mol % Ce surface-doped Ni-87 NMC (as shown by curve 1305), 1 mol % Mg surface-doped Ni-87 NMC (as shown by curve 1306), 2 mol % Co surface-doped Ni-87 NMC (as shown by curve 1307), 1 mol % Al surface-doped Ni-87 NMC (as shown by curve 1308), 2 mol % Mn surface-doped Ni-87 NMC (as shown by curve 1309), and 1 mol % La surface-doped Ni-87 NMC (as shown by curve 1310). As shown, the capacity retention (in %) is represented by an ordinate and a total number of cycles is represented by an abscissa.

As shown by the plot 1300, and similar to the plot 1200 described above with reference to FIG. 12, the rinsing and sintered (undoped) Ni-87 NMC sample performed significantly worse than any other Ni-87 NMC sample due to a surface of the Ni-87 NMC being compromised after contact with water. However, each of the surface-doped Ni-87 NMC samples showed enhanced cycle life performance even though the salt-rinse surface doping process involved similar contact with water. The Nd, Al, and Co surface-doped Ni-87 NMC samples even showed improved cycle life performance relative to the pristine (undoped) Ni-87 NMC samples. As such, the plot 1300 indicates that introducing dopant metal ions in a rinsing solvent may stabilize a surface of a given NMC sample and thereby improve cycle life.

In this way, a method for single-stage salt-rinse surface doping of electrode active materials is provided. In some examples, a dopant salt rinse solution may be formed by dissolving a dopant salt in a rinsing solvent, where the dopant salt may include one or more dopant ions. An electrode active material may be rinsed with the dopant salt rinse solution to remove residual lithium salts. Unexpectedly, the residual lithium salts may contribute to the single-stage salt-rinse surface doping by acting as precipitants in a precipitation reaction, allowing the one or more dopant ions to precipitate onto the surface of the electrode active material while simultaneously dissolving the residual lithium salts into the dopant salt rinse solution. Accordingly, in some examples, dopant precipitates formed from the one or more dopant ions and respective anions from the residual lithium salts may have a lower solubility than each of the residual lithium salts and a product salt formed from lithium ions and respective anions of the dopant salt, such that the precipitation reaction is favored. The dopant precipitates may be heated to diffuse the one or more dopant ions into the surface of the electrode active material. A technical effect of the single-stage salt-rinse surface doping is that structural stability and surface conditions may be improved via doping of the dopant ions while electrochemical performance may be simultaneously improved by mitigating the residual lithium salts at the surface of the electrode active material.

In one example, a method comprises dissolving a dopant salt in a rinsing solvent to form a dopant salt rinse solution, rinsing an electrode active material with the dopant salt rinse solution to obtain a uniformly surface-coated electrode active material, and heating the uniformly surface-coated electrode active material to form a uniformly surface-doped electrode active material. A first example of the method further includes wherein rinsing the electrode active material with the dopant salt rinse solution to obtain the uniformly surface-coated electrode active material comprises mixing the electrode active material with the dopant salt rinse solution to form a mixture, filtering the mixture to isolate a filtrate, and drying the filtrate. A second example of the method, optionally including the first example of the method, further includes wherein the dopant salt comprises cations of any one of Al, Mg, Mn, Co, Ni, Ti, Zr, Sn, Cu, Ca, La, Ce, Y, Nd, W, Na, K, V, Nb, Mo, Fe, Zn, F, Cl, Br, S, Se, P, Sb, Si, Ge, Ga, and B, or a combination thereof. A third example of the method, optionally including one or more of the first and second examples of the method, further includes wherein the dopant salt comprises cations of any one of Al, Mg, Mn, Co, Ni, Ti, Zr, W, F, and B, or a combination thereof. A fourth example of the method, optionally including one or more of the first through third examples of the method, further includes wherein a surface region of the uniformly surface-doped electrode active material comprises a uniform distribution of the cations. A fifth example of the method, optionally including one or more of the first through fourth examples of the method, further includes wherein the cations are included in the uniformly surface-doped electrode active material at 0.1 to 2 mol %. A sixth example of the method, optionally including one or more of the first through fifth examples of the method, further includes wherein cations of Mn and/or cations of Co are included in the dopant salt, and wherein the cations are included in the uniformly surface-doped electrode active material at 0.1 to 15 mol %. A seventh example of the method, optionally including one or more of the first through sixth examples of the method, further includes wherein the dopant salt comprises one or more dopant oxides, one or more dopant acetates, one or more dopant nitrides, one or more dopant sulfates, one or more dopant fluorides, one or more dopant nitrates, one or more dopant phosphides, one or more dopant sulfides, one or more dopant iodides, one or more dopant phosphates, one or more dopant carbonates, one or more dopant oxalates, one or more dopant acetylacetones, or a combination thereof. An eighth example of the method, optionally including one or more of the first through seventh examples of the method, further includes wherein the electrode active material comprises one or more lithium insertion electrode materials. A ninth example of the method, optionally including one or more of the first through eighth examples of the method, further includes wherein the electrode active material is a cathode active material comprising stoichiometric NMC, lithium-rich NMC, NCA, NCMA, LNO, spinel LMO, spinel LNMO, LFP, or a combination thereof. A tenth example of the method, optionally including one or more of the first through ninth examples of the method, further includes wherein the uniformly surface-doped electrode active material is NMC or doped NMC. An eleventh example of the method, optionally including one or more of the first through tenth examples of the method, further includes wherein the electrode active material is an anode active material comprising LTO, graphite, graphene, silicon, a silicon oxide, a tin oxide, or a combination thereof. A twelfth example of the method, optionally including one or more of the first through eleventh examples of the method, further includes wherein the rinsing solvent comprises water, ethanol, methanol, isopropanol, acetone, acetone nitrile, ethyl acetate, ethylene glycol, or a combination thereof.

In another example, a method comprises dissolving a metal salt in a rinsing solvent to form an aqueous rinse solution, and thereafter mixing a cathode active material with the aqueous rinse solution to form a mixture, and thereafter, optionally without any further rinsing, isolating a coated cathode active material from the mixture, heating the coated cathode active material to obtain a surface-doped cathode active material, and forming a cathode slurry comprising the surface-doped cathode active material. A first example of the method further includes wherein mixing the cathode active material with the aqueous rinse solution comprises dissolving a residual lithium salt on a surface of the cathode active material, and precipitating a dopant precipitate on the surface of the cathode active material while producing a product salt, where the dopant precipitate is formed from a cation of the metal salt and an anion of the residual lithium salt, where a product salt is formed from lithium and an anion of the metal salt is soluble in the rinsing solvent, and where the dopant precipitate has a lower solubility in the rinsing solvent than each of the residual lithium salt and the product salt. A second example of the method, optionally including the first example of the method, further includes wherein the metal salt is a salt of any one of Al, Mg, Mn, Co, Ni, Ti, Zr, W, F, and B, or a combination thereof. A third example of the method, optionally including one or more of the first and second examples of the method, further includes wherein the cathode active material comprises an NMC having a molar content of nickel of 60% or greater of a total molar content of nickel, manganese, and cobalt. A fourth example of the method, optionally including one or more of the first through third examples of the method, further includes wherein the cathode slurry further comprises a conductive additive and a binder.

In yet another example, a doped cathode material comprises NMC, and a dopant comprising an ion of any one of Al, Mg, Mn, Co, Ni, Ti, Zr, Sn, Cu, Ca, La, Ce, Y, Nd, W, Na, K, V, Nb, Mo, Fe, Zn, F, Cl, Br, S, Se, P, Sb, Si, Ge, Ga, and B, or a combination thereof, wherein the dopant is uniformly doped into a surface region of the NMC, and wherein less than 10000 ppm of residual lithium salts are present at a surface of the doped cathode material. A first example of the doped cathode material further includes wherein the dopant is more uniformly doped into the surface region of the NMC than via a dry surface doping process. A second example of the doped cathode material, optionally including the first example of the doped cathode material, further includes wherein the dopant comprises a metal ion having an ionic radius of 50 pm or greater.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   dissolving a dopant salt in a rinsing solvent to form a dopant salt rinse solution;
   rinsing an electrode active material with the dopant salt rinse solution to obtain a uniformly surface-coated electrode active material, wherein rinsing the electrode active material with the dopant salt rinse solution to obtain the uniformly surface-coated electrode active material comprises:
      mixing the electrode active material with the dopant salt rinse solution to form a mixture, wherein mixing the electrode active material with the dopant salt rinse solution comprises:
         dissolving a residual lithium salt on a surface of the electrode active material; and
         precipitating a dopant precipitate on the surface of the electrode active material while producing a product salt, where the dopant precipitate is formed from a cation of the dopant salt and an anion of the residual lithium salt, where the product salt is formed from lithium and an anion of the dopant salt is soluble in the dopant salt rinse solution, and where the dopant precipitate has a lower solubility in the dopant salt rinse solution than each of the residual lithium salt and the product salt;
      filtering the mixture to isolate a filtrate; and
      drying the filtrate to obtain the uniformly surface-coated electrode active material; and
   heating the uniformly surface-coated electrode active material to form a uniformly surface-doped electrode active material.

2. The method of claim 1, wherein the dopant salt comprises cations of any one of Al, Mg, Mn, Co, Ni, Ti, Zr, Sn, Cu, Ca, La, Ce, Y, Nd, W, Na, K, V, Nb, Mo, Fe, Zn, F, Cl, Br, S, Se, P, Sb, Si, Ge, Ga, and B, or a combination thereof.

3. The method of claim 1, wherein the dopant salt comprises cations of any one of Al, Mg, Mn, Co, Ni, Ti, Zr, W, F, and B, or a combination thereof.

4. The method of claim 2, wherein a surface region of the uniformly surface-doped electrode active material comprises a uniform distribution of the cations.

5. The method of claim 2, wherein the cations are included in the uniformly surface-doped electrode active material at 0.1 to 2 mol %.

6. The method of claim 1, wherein cations of Mn and/or cations of Co are included in the dopant salt, and wherein the cations are included in the uniformly surface-doped electrode active material at 0.1 to 15 mol %.

7. The method of claim 1, wherein the dopant salt comprises one or more dopant oxides, one or more dopant acetates, one or more dopant nitrides, one or more dopant sulfates, one or more dopant fluorides, one or more dopant nitrates, one or more dopant phosphides, one or more dopant sulfides, one or more dopant iodides, one or more dopant phosphates, one or more dopant carbonates, one or more dopant oxalates, one or more dopant acetylacetones, or a combination thereof.

8. The method of claim 1, wherein the electrode active material comprises one or more lithium insertion electrode materials.

9. The method of claim 1, wherein the electrode active material is a cathode active material comprising stoichiometric NMC, lithium-rich NMC, NCA, NCMA, LNO, spinel LMO, spinel LNMO, LFP, or a combination thereof.

10. The method of claim 1, wherein the uniformly surface-doped electrode active material is NMC or doped NMC.

11. The method of claim 1, wherein the electrode active material is an anode active material comprising LTO, graphite, graphene, silicon, a silicon oxide, a tin oxide, or a combination thereof.

12. The method of claim 1, wherein the rinsing solvent comprises water, ethanol, methanol, isopropanol, acetone, acetone nitrile, ethyl acetate, ethylene glycol, or a combination thereof.

13. A method, comprising:
   dissolving a metal salt in a rinsing solvent to form an aqueous rinse solution; and thereafter,
   mixing a cathode active material with the aqueous rinse solution to form a mixture, wherein mixing the cathode active material with the aqueous rinse solution comprises:
      dissolving a residual lithium salt on a surface of the cathode active material; and
      precipitating a dopant precipitate on the surface of the cathode active material while producing a product salt, where the dopant precipitate is formed from a cation of the metal salt and an anion of the residual lithium salt, where the product salt is formed from lithium and an anion of the metal salt is soluble in the rinsing solvent, and where the dopant precipitate has a lower solubility in the rinsing solvent than each of the residual lithium salt and the product salt; and thereafter,
   without any further rinsing:
      isolating a coated cathode active material from the rinsing solvent, the rinsing solvent including dissolved Li+;
      heating the coated cathode active material to obtain a surface-doped cathode active material; and
      forming a cathode slurry comprising the surface-doped cathode active material.

14. The method of claim 13, wherein the metal salt is a salt of any one of Al, Mg, Mn, Co, Ni, Ti, Zr, W, F, and B, or a combination thereof.

15. The method of claim 13, wherein the cathode active material comprises an NMC having a molar content of nickel of 60% or greater of a total molar content of nickel, manganese, and cobalt.

* * * * *